(12) United States Patent
Goto et al.

(10) Patent No.: US 7,811,661 B2
(45) Date of Patent: Oct. 12, 2010

(54) HEAT-SENSITIVE ADHESIVE MATERIAL

(75) Inventors: Hiroshi Goto, Atsugi (JP); Tomoyuki Kugo, Numazu (JP); Mitsunobu Morita, Numazu (JP); Norihiko Inaba, Numazu (JP); Tohru Kitano, Numazu (JP); Takehito Yamaguchi, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 660 days.

(21) Appl. No.: 11/225,226

(22) Filed: Sep. 13, 2005

(65) Prior Publication Data

US 2006/0068191 A1     Mar. 30, 2006

(30) Foreign Application Priority Data

| Sep. 13, 2004 | (JP) | ............................. 2004-265278 |
| Sep. 14, 2004 | (JP) | ............................. 2004-266713 |
| Sep. 15, 2004 | (JP) | ............................. 2004-268948 |

(51) Int. Cl.
- B32B 3/00 (2006.01)
- B32B 9/00 (2006.01)
- B32B 7/12 (2006.01)

(52) U.S. Cl. ................. 428/292.1; 428/313.3; 428/343; 428/318.4; 428/346

(58) Field of Classification Search ........................ None
See application file for complete search history.

(56) References Cited

U.S. PATENT DOCUMENTS

| 6,696,150 | B2 | 2/2004 | Ikeda et al. ................. 428/343 |
| 6,828,017 | B2 | 12/2004 | Kugo et al. ................. 428/349 |
| 7,021,214 | B2 | 4/2006 | Kugo et al. ................. 101/485 |
| 2002/0064613 | A1* | 5/2002 | Kugo et al. ................ 428/35.2 |
| 2003/0039917 | A1 | 2/2003 | Naruse et al. ............ 430/270.1 |
| 2003/0175507 | A1 | 9/2003 | Ikeda et al. ................. 428/343 |
| 2004/0043236 | A1 | 3/2004 | Kugo et al. ................. 428/500 |
| 2004/0265573 | A1 | 12/2004 | Morita et al. ............... 428/343 |

FOREIGN PATENT DOCUMENTS

| EP | 1243439 A1 | 9/2002 |
| EP | 1327671 A1 | 7/2003 |
| JP | 62-21835 | 5/1987 |
| JP | 6-57223 | 3/1994 |
| JP | 6-100847 | 4/1994 |

(Continued)

OTHER PUBLICATIONS

Kobunshi Kankokai; "Handbook of Adhesives", 12th Edition, p. 131-135 (1980).

(Continued)

*Primary Examiner*—D. Lawremce Tarazano
*Assistant Examiner*—Camie S Thompson
(74) *Attorney, Agent, or Firm*—Cooper & Dunham LLP

(57) ABSTRACT

In order to provide heat-sensitive adhesive materials that represent high pressure-sensitive adhesive strength with respect to rough adherends such as cardboards or polyolefin wraps and lower decrease of adhesive strength with time, are thermally activated with lower energy and exhibit excellent blocking resistance, heat-sensitive adhesive materials are disclosed that contain a support, an underlayer, and a heat-sensitive adhesive layer, in this order, wherein the underlayer comprises a thermoplastic resin and a hollow filler, and the glass transition temperature of the thermoplastic resin is −70° C. or higher and below 0° C.

27 Claims, 1 Drawing Sheet

FOREIGN PATENT DOCUMENTS

| | | |
|---|---|---|
| JP | 6-100848 | 4/1994 |
| JP | 9-20079 | 1/1997 |
| JP | 10-35126 | 2/1998 |
| JP | 10-152660 | 6/1998 |
| JP | 11-65451 | 3/1999 |
| JP | 11-79152 | 3/1999 |
| JP | 11-157141 | 6/1999 |
| JP | 11-311945 | 11/1999 |
| JP | 2001-48139 | 2/2001 |
| JP | 2001-191643 | 7/2001 |
| JP | 2001-303036 | 10/2001 |
| JP | 2002-114954 | 4/2002 |
| JP | 2002-121532 | 4/2002 |
| JP | 2002-146303 | 5/2002 |
| JP | 2002-283717 | 10/2002 |
| JP | 2003-19862 | 1/2003 |

OTHER PUBLICATIONS

Feb. 16, 2006 official Communication and European Search Report in corresponding European appln. No. EP 05 01 9905.

Database WPI, Section Ch, Week 199120; Derwent Publications, Ltd., London, GB; AN 1999-144012, XP002354335; Apr. 4, 1991.

* cited by examiner

HEAT-SENSITIVE ADHESIVE MATERIAL

BACKGROUND

1. Technical Field

This disclosure relates to heat-sensitive adhesive materials, containing a heat-sensitive adhesive layer, that exhibit superior adhesive strength with adherends and activate thermally even with lower energy, in which the heat-sensitive adhesive layer is non pressure-sensitive at ordinary temperatures and pressure-sensitive at higher temperatures, and also the pressure-sensitiveness can be significantly maintained after development thereof.

2. Description of the Related Art

Pressure-sensitive label sheets have been spreading their applications, for example, in the fields of price-display labels, commodity-display or bar-code labels, quality-display labels, weight-display labels, and advertising labels or stickers. Further, various methods for recording labels have been developed such as inkjet recording methods, hot-melt recording methods, and pressure-sensitive recording methods.

Such pressure-sensitive label sheets typically have a construction that a pressure-sensitive layer and a peeling paper are laminated to a surface opposite to an information recording surface, which construction is extremely popular by virtue that simple operation of pressing after removing a peeling paper may conveniently provide an adhered condition. The peeling papers generally are not recovered and reused, namely are discarded in most cases. Recently, pressure-sensitive label sheets, which comprise a heat-sensitive adhesive layer and no need of the peeing paper owing to no pressure-sensitive at ordinary temperatures, have been attracting attentions for use as thermosensitive materials (see Japanese Utility Model Application Laid-Open No. 06-25869).

The heat-sensitive adhesive layers of such thermosensitive label sheets are comprised of a thermoplastic resin, hot-melt material, and optional tackifier, for example (see "Adhesive Handbook", 12 th edition, pp 131-135, 1980, by Kobunshi Kankokai).

However, the heat-sensitive adhesive layer of such thermosensitive label sheet suffers from gradual decrease of the pressure-sensitive adhesive strength after the development of pressure-sensitiveness, and excessively high energy is required for thermal activation.

In order to solve the deficiencies, a thermal insulation layer is proposed that contains hallow plastic particles and a water-soluble binder and is present between a support and a heat-sensitive adhesive layer so as to lower the thermal energy i.e. to raise the sensitivity during the thermal activation (see Japanese Patent (JP-B) No. 2683733 and Japanese Patent Application Laid-Open (JP-A) No. 10-152660). The proposal may provide a successful effect to decrease thermal energy for activating thermally the heat-sensitive adhesive layer. However, the proposal suffers from insufficient pressure-sensitive adhesive strength with respect to rough adherends such as cardboards or polyolefin wraps since a water-soluble binder is utilized that is substantially no pressure-sensitive at ordinary temperatures. Moreover, the proposal also suffers from gradual decrease of the pressure-sensitive adhesive strength after the development of pressure-sensitiveness. As such, investigation and improvement are still required currently.

Films and synthetic papers have been expanding their market for use as supports from the viewpoints of waterproofness, label strength, and smoothness. However, the market of the heat-sensitive adhesive materials does not follow the expanding market of the supports of films and synthetic papers. The reasons are considered as follows.

(i) The supports of films or synthetic papers tend to refuse permeation of the heat-sensitive adhesive layer, often resulting in disadvantages such as repelling, pin holes, and nonuniformity.

(ii) The supports of films or synthetic papers typically represent a lower anchor effect with an active layer, thus the active layer tends to fall off during thermal activation.

(iii) The supports of films or synthetic papers tend to shrink and wrinkle itself during thermal activation.

(iv) The supports of films or synthetic papers exhibit higher strength and is less likely to break, thus tends to leave only the heat-sensitive adhesive layer on commodities when labels on commodities are to be peeled off, resulting in inferior appearance.

The item (i) described above may possibly be improved by optimizing the amount or species of surfactant or dispersant added to the heat-sensitive adhesive layer. However, the items (ii) to (iv) have not been solved yet since the problems issue inherently from thermosensitive materials and synthetic papers.

Blocking is one of serious problems in terms of previous thermosensitive materials, which is a phenomenon to generate pressure-sensitivity even when the pressure-sensitivity is undesired still. The blocking is often induced when the thermosensitive material is exposed at temperatures higher than ordinary temperatures for a long time. When the blocking is induced either in a condition of a roll or in a condition of cut and stacked sheets, the heat-sensitive adhesive layer adheres to the facing surface, consequently, the paper-feed comes to troublesome, and also the printing tends to be adversely affected.

With respect to the methods or means to prevent the blocking, disclosed are a method to compound a lubricant wax into heat-sensitive adhesive materials (see Japanese Patent Application Publication (JP-A) No. 62-21835), a method to prevent the blocking by way of protecting a surface of hot-melt material with an inorganic compound or colloid particles and suppressing the softening of the hot-melt material (see JP-A Nos. 06-57223, 06-100847, and 06-100848), and the like. However, the compounding of waxes leads to not only insufficient effect to prevent blocking but also adverse affect to decrease the pressure sensitivity. When the surface of hot-melt material is protected with an inorganic compound or colloid particles, such disadvantages tend to appear that melting or diffusing of the hot-melt materials requires longer period, the pressure sensitivity hardly generates in the heat-sensitive adhesive material, and adhesive property is inferior, thus resulting in practical difficulties. In addition, the blocking may be avoided by use of a plasticizer having a high melting point; however, adverse effects such as remarkable drop of adhesive strength generate, thus the transportation and storage are practically carried out at lower temperatures at which the blocking is far from the occurrences.

Further, printers are demanded for improving safety, power saving, and compactification. For example, JP-A Nos. 11-79152, 11-65451, 10-35126, 11-157141, 11-311945, 2001-303036, and 2001-48139 illustrate thermal activation methods or activation units by means of thermal heads.

Thermal heads for activation may reduce energy consumption at the thermal activation, and also the power saving and compactification may be improved. However, the thermal head utilized for an activation means inevitably results in serious problems such as decrease of adhesive strength and short life of the thermal head, since the activation is performed through heating and contacting the thermal head with the heat-sensitive adhesive layer, a large amount of adhesive dregs or debris deposits on a resistor of the thermal head, and the thermal energy cannot be effectively supplied to the heat-sensitive adhesive layer.

In order to solve these problems, JP-A No. 11-79152 described above proposes a thermal head on which a releasant layer is disposed, and JP-A No. 11-65451 described above proposes a thin sheet disposed between the thermal head and the heat-sensitive adhesive layer. However, these proposals suffer from insufficient adhesive strength since the thermal conductivity decreases and thermal energy cannot be supplied sufficiently to the thermal activation layer; the cost for producing the thermal heads comes to higher; thus these proposals have not been realized in the current market.

SUMMARY

In an aspect of this disclosure, heat-sensitive adhesive materials are provided in which adhesive strength is higher with respect to rough-surface adherends (e.g. cardboards or polyolefin wraps), the adhesive strength is far from gradual decrease with time, thermal activation can be achieved even with lower energy, blocking resistance is superior, and in particular the heat-sensitive adhesive layers are substantially free from dropouts even the supports are of synthetic papers or plastic films, shrinkage wrinkles can be avoided on the support, and substantially no adhesive residue exists at peeling off the labels.

In another aspect of this disclosure, heat-sensitive adhesive materials are provided in which the blocking resistance is enhanced, the decrease of adhesive strength is moderated that is caused by deposition of adhesive residue derived through activation of thermal heads, thereby the excellent adhesive property is brought about stably.

In another aspect, the heat-sensitive adhesive material according to the present invention comprises a support, an underlayer, and a heat-sensitive adhesive layer, in this order, wherein the underlayer comprises a thermoplastic resin and a hollow filler, and the glass transition temperature of the thermoplastic resin is from −70° C. to below 0° C.; consequently, the heat-sensitive adhesive layer and the underlayer can be intermixed each other during heating operation, the amount of the pressure-sensitive adhesive increases, thus the pressure-sensitive adhesive strength may be enhanced with respect to rough adherends such as cardboards or polyolefin wraps. Further, plastic-spherical hollow particles having higher porosities, included into the underlayer, exert a heat-insulation effect, thereby the overlying heat-sensitive adhesive layer may be thermally activated with lower energy and/or the blocking resistance may be enhanced. Moreover, such effects may be obtained that the heat-sensitive adhesive layer may be far from dropout during thermal activation, shrink wrinkles may be prevented from the support, and adhesive residue may be prevented at peeling off the labels, even when synthetic papers or plastic films are utilized for the support.

In another aspect, the heat-sensitive adhesive material according to the present invention comprises a support, a heat-sensitive adhesive layer, and a protective layer in this order; on the opposite side of the support, a heat-sensitive adhesive layer is disposed that contains a thermoplastic resin and a hot-melt material; and the protective layer comprises a polyvinyl alcohol having a reactive carbonyl group and a hydrazide compound. In the heat-sensitive adhesive material according to the present invention, the blocking resistance is superior, the decrease of adhesive property may be reduced that is caused by deposition of adhesive residue derived through activation of thermal heads, thus the adhesive property may be stable with time.

DESCRIPTION OF THE PREFERRED EMBODIMENTS

First Aspect of Heat-Sensitive Adhesive Material

Figure 1:
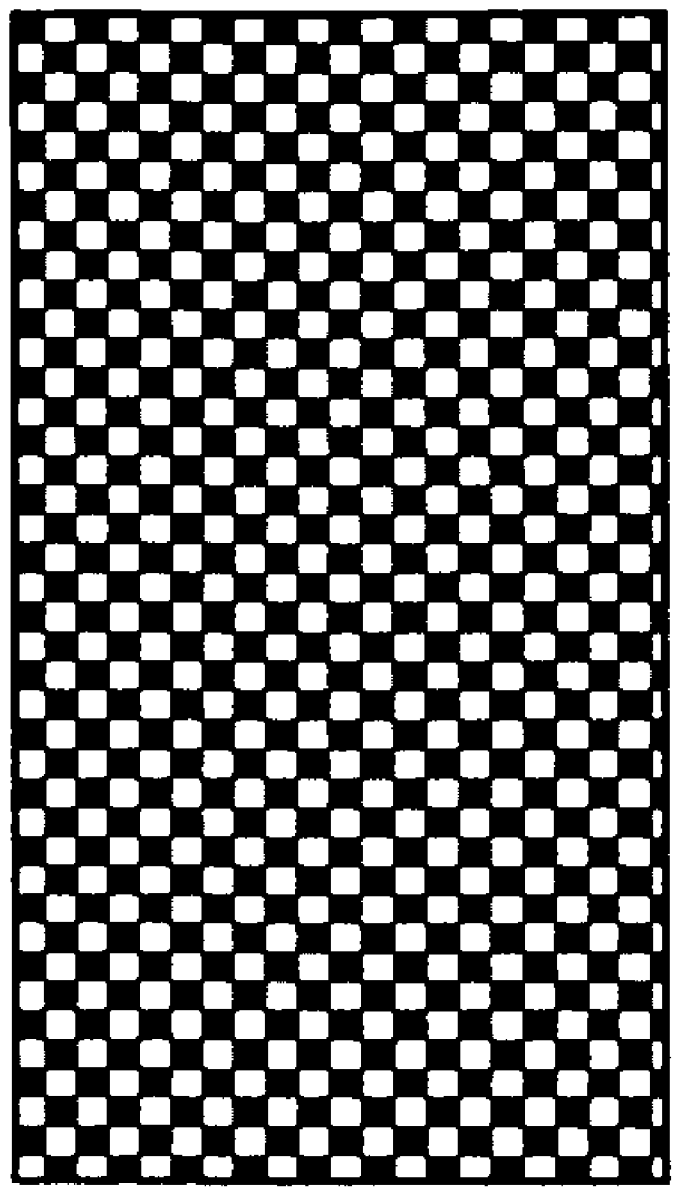
FIG. 1 is a schematic checkered pattern for conducting one dot in a matching test with printers.

The heat-sensitive adhesive material according to the present invention comprises, in the first aspect, a support, an underlayer, a heat-sensitive adhesive layer, and the other layers depending on requirements. Various recording layers and protective layers may be provided on the side of the support opposite to the underlayer and the heat-sensitive adhesive layer.

<Support>

The shape, structure, and size of the support may be properly selected depending on the application; for example, the shape may be planar, the structure may be of monolayer or laminate, and the size may be properly selected depending on the size of the heat-sensitive adhesive material.

The material of the support may be properly selected depending on the application, and may be one of inorganic materials and organic materials. Examples of the inorganic materials include glass, quartz, silicon, silicon oxide, aluminum oxide, $SiO_2$, and metals. Examples of the organic materials include paper such as high quality paper, art paper, coated paper, and synthetic paper; cellulose derivatives such as cellulose triacetate; polyester resins such as polyethylene terephthalate and polybutylene terephthalate, polyolefins such as polycarbonate, polystyrene, polymethylmethacrylate, polyamide, polyethylene, and polypropylene. Among these, high quality paper, coated paper, plastic films, and synthetic papers are preferable, and plastic films and synthetic papers are preferable in particular.

Specific examples of the synthetic papers are those based on synthetic fibers such as polyethylene, polypropylene, polyethylene terephthalate, and polyamide, and those including such synthetic papers in part, on one side, or on both sides. Examples of commercially available synthetic paper are FPG, FGS, GFG, and KPK produced by Yupo Corporation.

The supports of plastic film or synthetic paper typically provides inferior infiltration of heat-sensitive adhesive layers etc. and remarkably low anchor effect compared to high quality paper or old paper formed of pulp. On the other hand, recently, contact activation processes by use of thermal heads have been attracting attention on the grounds of safety, high-speed, and on-demand in thermal activation systems. In the contact activation processes by use of the thermal head, the active layer tends to be shaved unfortunately, the heat-sensitive adhesive layers fall off remarkably in particular since the thermal head comes to a high temperature for activating the entire surface of labels in the thermal activation. The present invention may prevent the dropout or shrinkage of plastic film or synthetic paper during the thermal activation even when plastic films or synthetic papers are employed for the support, and also the adhesive residue may be excluded during label exchanges.

Preferably, the support is surface-treated by way of corona discharge, oxidizing e.g. by chromate, etching, adhesion-promotion, static elimination, etc. in order to enhance the adhesive property. Preferably, the support is made white by adding a white pigment such as titanium oxide. The thickness of the support may be properly selected depending on the application; preferably, the thickness is 50 μm to 2,000 μm, more preferably 100 μm to 1,000 μm.

<Underlayer>

The underlayer comprises a thermoplastic resin of which the glass transition temperature (Tg) is from −70° C. to below 0° C., a hollow filler, and the other optional ingredients. Preferably, the glass transition temperature is −70° C. to −2° C., more preferably −70° C. to −5° C.

—Thermoplastic Resin—

The thermoplastic resin having a glass transition temperature (Tg) of from −70° C. to below 0° C. may be properly selected depending on the application; example thereof include natural rubber latexes synthesized by graft copolymerization of vinyl monomers, acrylate copolymers, methacrylate copolymers, acrylate-methacrylate copolymers, acrylate-styrene copolymers, acrylate-methacrylate-styrene copolymers, and ethylene-vinyl acetate copolymers. These may be use alone or in combination.

When the glass transition temperature (Tg) of the thermoplastic resin in the underlayer is out of the range defined above, the thermoplastic resin brings about substantially no desirable feature of the underlayer, namely, the adhesive strength with respect to rough adherends such as cardboards or polyolefin wraps is lower, and the pressure-sensitive adhesive strength is merely of the overlying heat-sensitive adhesive layer.

—Hollow Filler—

The hollow filler may be properly selected, without particular limitations, from inorganic fillers and organic fillers having a volume average particle size of 0.5 μm to 10 μm. Examples of the inorganic fillers include calcium carbonate, silica, titanium oxide, aluminum hydroxide, clay, calcined clay, magnesium silicate, magnesium carbonate, white carbon, zinc oxide, barium sulfate, and surface-treated calcium carbonate.

Examples of the organic fillers include the fine particles of urea-formaldehyde resins, styrene-methacrylic acid copolymers, and polystyrene resins.

Considering the demand to thermally activate at lower temperatures i.e. highly sensitive for thermal activation, preferably, the hollow filler is spherical hollow particles of plastics that exhibit a heat-insulation effect and have a volume average particle diameter of 2.0 μm to 5.0 μm and hollow porosity of 70% or higher. More preferably, the filler is hallow particles having a maximum particle diameter of 10.0 μm or less, a volume average particle diameter of 2.0 μm to 5.0 μm, and a hollow ratio of 70% or higher.

When the hollow ratio is lower, the high sensitive effect on thermal activation is poor since the heat-insulation effect is insufficient such that the thermal energy from the thermal head flows easily through the support to outward. When the volume average particle diameter is above 5.0 μm and a heat-sensitive adhesive layer is disposed on the underlayer, the adhesive strength often decreases after the thermal activation due to absence of the heat-sensitive adhesive layer at the sites around the larger particles; when the volume average particle diameter is below 2.0 μm, the hollow ratio of 70% or higher is hardly assured, resulting in insufficient sensitive effect on thermal activation.

The spherical hollow particles of plastic is referred to as hallow particles each has a shell of a thermoplastic resin and contains air or other gas within the cavity, thereby representing entirely a porous configuration.

The term "hollow ratio" of the hollow particle is defined herein as a ratio between an inner diameter and an outer diameter of hollow particle, and is expressed by the following equation.

Hollow ratio=(inner diameter)/(outer diameter)×100  <Equation (1)>

Preferably, the hollow ratio of hollow particles employed in the underlayer is 70% or higher, in order that the adhesive strength may be attained in the process of thermal activation by use of thermal heads.

Preferably, an acrylonitrile-vinylidene chloride-methylmethacrylate copolymer or acrylonitrile-methacrylonitrile-isobonylmethacrylate copolymer is employed for the substance to produce the spherical hollow particles that satisfy all of the requirements described above.

Preferably, the mass ratio of the thermoplastic resin, having a glass transition temperature (Tg) of from −70° C. to below 0° C., and the hollow filler is 0.1 part by mass to 2 parts by mass of the hollow filler based on 1 part by mass of the thermoplastic resin. When the ratio of the hollow filler is below 0.1 part by mass, the blocking property may be insufficient due to poor sensitive effect on thermal activation; and when the ratio of the hollow filler is above 2 parts by mass, the adhesive strength with respect to rough adherends such as cardboards or polyolefin wraps may be lower, and the pressure-sensitive adhesive strength may be merely of the overlying heat-sensitive adhesive layer.

Preferably, the mass ratio of the hollow filler to the thermoplastic resin (hollow filler:thermoplastic resin) in the underlayer is 1:0.5 to 1:3.0, more preferably 1:1.5 to 1:2.5, which range may afford the heat-sensitive adhesive material with superior adhesive property with respect to mirror surfaces such as of SUS, in particular.

Preferably, the mass ratio of the hollow filler to the thermoplastic resin (hollow filler:thermoplastic resin) in the underlayer is 1:6.0 to 1:20.0, more preferably 1:8.0 to 1:16.0, which range may afford the heat-sensitive adhesive material with superior adhesive property with respect to mirror surfaces and cardboard surfaces, in particular.

The underlayer may be properly formed by conventional methods without particular limitations, for example, may be formed by a coating method using a coating liquid that contains desirable ingredients.

The coating method may be one of blade coating methods, gravure coating methods, gravure offset coating methods, bar coating methods, roll coating methods, knife coating methods, air knife coating methods, comma coating methods, U-comma coating methods, AKKU coating methods, smoothing coating methods, micro gravure coating methods, reverse roll coating methods, 4-roll or 5-roll coating methods, dip coating methods, drop-curtain coating methods, slide coating methods, and die coating methods.

The coated amount of the coating liquid on the underlayer is preferably 1 g/m$^2$ to 35 g/m$^2$, more preferably 2 g/m$^2$ to 25 g/m$^2$ after drying. When the coated amount of the coating liquid is less than 1 g/m$^2$, sufficient adhesive strength may not be obtained in the adhesion process after heating and also the thermal insulation effect may be poor; and when the coated amount is above 35 g/m$^2$, the adhesive strength and the thermal insulation effect may saturate, which is undesirable in terms of economical views.

<Heat-Sensitive Adhesive Layer>

The heat-sensitive adhesive layer may comprise a thermoplastic resin, tackifier, hot-melt substance, eutectic agent, and the other optional ingredients.

—Thermoplastic Resin—

The thermoplastic resin may be properly selected depending on the application. When the thermoplastic resin within the heat-sensitive adhesive layer is the same or similar as the resin within the underlayer, the adhesive strength may be beneficially enhanced with rough-surface adherends e.g. cardboards or polyolefin wraps, since the compatibility of the resins is enhanced between the both layers.

Examples of the thermoplastic resins include natural rubber latexes synthesized by graft copolymerization of vinyl monomers, acrylate copolymers, methacrylate copolymers, acrylate-methacrylate copolymers, acrylate-styrene copolymers, acrylate-methacrylate-styrene copolymers, and ethylene-vinyl acetate copolymers. These may be use alone or in combination.

Preferably, the content of the thermoplastic resin is 10% by mass to 60% by mass, more preferably 15% by mass to 50% by mass within the heat-sensitive adhesive layer. When the content of the thermoplastic resin is below 10% by mass or above 60% by mass, the adhesive strength is undesirably lower. When the content of the thermoplastic resin having a lower Tg is above 60% by mass, adhesive ability tends to generate at ambient storage temperatures, thus possibly resulting in storage problems such as blocking.

—Hot-Melt Substance—

Hot melt substances usually provides resins with no plasticity at ordinary temperatures, since the hot melt substances are solid at ordinary temperatures. Upon heating, the hot melt substance typically melts by action of heating, then swells and softens the thermoplastic resins to develop adhesive ability, thereafter crystallizes slowly; therefore, the adhesive ability is maintained for a long period after the heat source is removed.

Preferable examples of the hot-melt substances are benzotriazole compounds expressed by the formula (1) shown below;

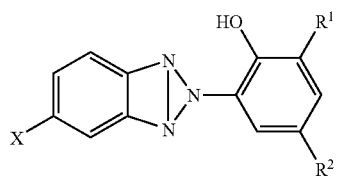

formula (1)

wherein each of $R^1$ and $R^2$ in the formula (1), which may be the same or different each other, represents one of hydrogen atom, alkyl groups, and α,α-dimethylbenzyl group; X represents one of hydrogen atom and halogen atoms.

Preferably, the alkyl group has a carbon number of 1 to 8; examples of the alkyl groups include methyl group, ethyl group, n-propyl group, n-butyl group, n-pentyl group, n-hexyl group, and n-heptyl group; these groups may be further substituted by a substituent. Examples of the substituents include hydroxide group, halogen atoms, nitro group, carboxyl group, cyano group; and alkyl groups, aryl groups, and heterocyclic groups which may further contain a certain substituent such as halogen atoms and nitro group. The halogen atoms are be fluorine, chlorine, bromine, and iodine.

Specific examples of the benzotriazole compound expressed by the formula (1) are 2-(2'-hydroxy-5'-methylphenyl)benzotriazole, 2-(2'-hydroxy-5'-t-octylphenyl)benzotriazole, 2-(2'-hydroxy-3'-t-butyl-5'-methylphenyl)-5-chlorobenzotriazole, 2-(2'-hydroxy-3',5'-di-t-amylphenyl) benzotriazole, 2-(2'-hydroxy-3',5'-t-butylphenyl)-5-chlorobenzotriazole, 2-[2'-hydroxy-3',5'-di(1,1-dimethylbenzyl)phenyl]benzotriazole, 2-(2'-hydroxy-3',5'-di-t-butylphenyl)benzotriazole, and 2-(2'-hydroxy-3'-sec-butyl-5'-t-butylphenyl)benzotriazole. These may be use alone or in combination.

Preferable examples of the hot-melt substance are hydroxybenzoate compounds expressed by the formula (2) shown below;

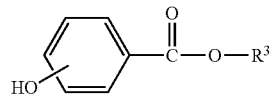

formula (2)

wherein $R^3$ in the formula (2) represents one of alkyl groups, alkenyl groups, aralkyl groups, and aryl groups, which may be further substituted by a substituent.

The alkyl group described above preferably has a carbon number of 1 to 18, examples thereof include linear alkyl groups such as methyl group, ethyl group, n-propyl group, n-butyl group, n-pentyl group, n-hexyl group, n-heptyl group, n-octyl group, n-nonyl group or n-decyl group; branched alkyl groups such as isobutyl group, isoamyl group, 2-methylbutyl group, 2-methylpentyl group, 3-methylpentyl group, 4-methylpentyl group, 2-ethylbutyl group, 2-methylhexyl group, 3-methylhexyl group, 4-methylhexyl group, 5-methylhexyl group, 2-ethylpentyl group, 3-ethylpentyl group, 2-methylheptyl group, 3-methylheptyl group, 4-methylheptyl group, 5-methylheptyl group, 2-ethylhexyl group, 3-ethylhexyl group, isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, 1-isobutyl-3-methylbutyl group, neopentyl group, tert-butyl group, tert-hexyl group, tert-amyl group or tert-octyl group; cylcoalkyl groups such as cyclohexyl group, 4-methylcyclohexyl group, 4-ethylcyclohexyl group, 4-tert-butylcyclohexyl group, 4-(2-ethylhexyl)cyclohexyl group, bornyl group, isobornyl group or adamantyl group. These may be further substituted by a substituent.

The alkenyl groups described above have preferably a carbon number of 2 to 8, examples thereof include vinyl group, allyl group, 1-propenyl group, methacryl group, crotyl group, 1-butenyl group, 3-butenyl group, 2-pentenyl group, 4-pentenyl group, 2-hexenyl group, 5-hexenyl group, 2-heptenyl group, and 2-octenyl group. These may be further substituted by a substituent.

The aralkyl groups described above may be properly selected depending on the application; examples thereof include benzyl group, phenylethyl group, and phenylpropyl group, which may be further substituted by a substituent.

The aryl groups described above is exemplified by phenyl group, naphthyl group, anthranyl group, fluorenyl group, phenalenyl group, phenanthranyl group, triphenylenyl group, and pilenyl group, which may be further substituted by a substituent.

The substituents of the alkyl groups, alkenyl groups, aralkyl groups, or aryl groups described above are hydroxide group, halogen atoms, nitro group, carboxyl group, cyano group; and alkyl groups, aryl groups, and heterocyclic groups which may further contain a certain substituent such as halogen atoms and nitro group.

Specific examples of the hydroxybenzoate compounds expressed by the formula (2) include m-hydroxymethylbenzoate, m-hydroxyethylbenzoate, m-hydroxyphenylbenzoate, p-hydroxymethylbenzoate, p-hydroxyethylbenzoate, p-hydroxy-n-butylbenzoate, p-hydroxystearylbenzoate, p-hydroxycyclohexylbenzoate, p-hydroxybenzylbenzoate, p-hydroxy-4-chlorobenzylbenzoate, p-hydroxy-4-methylbenzylbenzoate, and p-hydroxyphenylbenzoate. These may be used alone or in combination.

Preferable examples of the hot-melt substances are the compounds expressed by the formulas (3), (4), and (5) shown below;

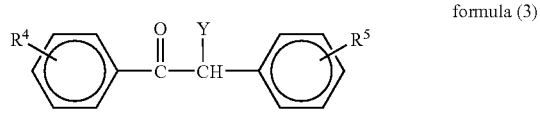

formula (3)

wherein each of $R^4$ and $R^5$ in the formula (3), which may be the same or different each other, represents one of alkyl groups and alkoxy groups; Y represents one of hydrogen atom and hydroxide group;

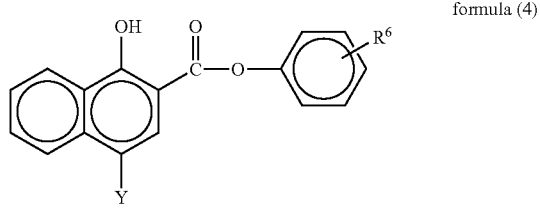

formula (4)

wherein $R^6$ in the formula (4) represents one of hydrogen atom, halogen atoms, alkyl groups, and alkoxy groups; Y represents one of hydrogen atom and hydroxide group;

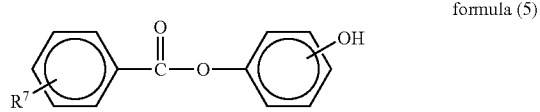

formula (5)

wherein $R^7$ in the formula (5) represents one of hydrogen atom, halogen atoms, alkyl groups, and alkoxy groups.

The alkyl groups in the formulas (3) to (5) may be the same with those in formula (1).

Examples of the alkoxy groups include methoxy group, ethoxy group, propyloxy group, i-propyloxy group, butoxy group, i-butoxy group, t-butoxy group, pentyloxy group, hexyloxy group, cyclohexyloxy group, heptyloxy group, octyloxy group, 2-ethylhexyloxy group, nonyloxy group, decyloxy group, 3,7-dimethyloctyloxy group, and lauryloxy group.

Examples of the compounds expressed by the formula (3) include Toluoin, Anisoin, m-Anisoin, Deoxytoluoin, Deoxy Anisoin, 4,4'-diethylbenzoin, and 4,4'diethoxybenzoin. These may be used alone or in combination.

Examples of the compounds expressed by the formula (4) include 1-hydroxy-2-naphthoic acid-phenyl, 1-hydroxy-2-naphthoic acid-p-chlorophenyl, 1-hydroxy-2-naphthoic acid-o-chlorophenyl, 1-hydroxy-2-naphthoic acid-p-methylphenyl, 1-hydroxy-2-naphthoic acid-o-methylphenyl, 1,4-dihydroxy-2-naphthoic acid-phenyl, 1,4-dihydroxy-2-naphthoic acid-p-chlorophenyl, and 1,4-dihydroxy-2-naphthoic acid-o-chlorophenyl. These may be used alone or in combination.

Examples of the compounds expressed by the formula (5) include benzoic acid-3-hydroxyphenyl, benzoic acid-4-hydroxyphenyl, benzoic acid-2-hydroxyphenyl, o-methylbenzoic acid-3-hydroxyphenyl, and p-chlorobenzoic acid-3-hydroxyphenyl. These may be used alone or in combination.

The compounds expressed by the formulas (1) to (5) are preferably solid at room temperatures, and may melt upon heating. The melting point of these compounds is preferably 70° C. or higher, more preferably 80° C. or higher, and preferably no higher than about 200° C.

When the melting point is less than 70° C., adhesive ability tends to generate at ambient storage temperatures, thus possibly resulting in storage problems such as blocking, and also undesirable adhesive ability often generates in the production processes when the coating liquid of the heat-sensitive adhesive material is coated and dried on supports, for example. On the other hand, when the melting point exceeds about 200° C., a large amount of energy is required for developing the adhesive ability, which is practically undesirable. Moreover, when a large amount of energy is applied to thermosensitive recording paper of a support, the printed images are unfortunately often illegible due to coloring of the thermosensitive recording layer.

When the hot-melt substances expressed by the formulas (1) to (5) have a volume average particle size of 0.5 μm or less, the hot-melt substances may act as a heat-active pressure-sensitive adhesive since dynamic heat-sensitivity is increased and compatibility generates with thermoplastic resins and tackifiers at lower energy. Further, the volume average particle size described above may enhance the shelflife at ordinary storage temperatures and improve the blocking resistance.

Preferably, the content of the compounds of the hot-melt substances expressed by the formulas (1) to (5) is 25% by mass to 80% by mass, more preferably 35% by mass to 70% by mass. When the content of the compounds of the hot-melt substances is less than 25% by mass and the hot-melt substances are combined with thermoplastic resins having a Tg of from −70° C. to below 0° C., adhesive ability tends to generate at ambient storage temperatures, thus possibly resulting in storage problems such as blocking and/or decrease of adhesive strength; and when the content is above 80% by mass, the adhesive strength is likely to decrease.

—Tackifier—

The tackifier is compounded in order to increase the adhesive strength of the heat-sensitive adhesive layer, and may be properly selected from conventional materials depending on the application. Examples of the tackifiers include rosin and the derivatives such as polymerized rosin and hydrogenated rosin; terpene resins and the derivatives such as modified aromatic terpene resins, terpene phenol resins, and hydrogenated terpene resins; petroleum resins, phenol resins, and xylene resins. These tackifiers may conform to the thermoplastic resins and the hot-melt substances thereby to significantly enhance the adhesive strength of the heat-sensitive adhesive layer.

Preferably, the melting point or the softening temperature of the tackifiers is 80° C. or higher, more preferably 80° C. to 200° C. The melting point or the softening temperature below 80° C. is likely to cause storage problems such as blocking at ordinary storage temperatures.

Preferably, the content of the tackifiers in the heat-sensitive adhesive layer is 1% by mass to 30% by mass, more preferably 1% by mass to 20% by mass. When the content is less than 1% by mass, the adhesive strength may be significantly low; and when the content is above 30% by mass, storage problems such as insufficient blocking resistance may generate at ordinary storage temperatures, or initial adhesive strength may be insufficient at lower ambient temperatures.

—Eutectic Agent—

Compounds, which are solid at room temperatures and melt upon heating, are suited to the eutectic agent. Preferably, the melting point of the compound is 70° C. or higher, more preferably 80° C. or higher, and preferably lower than about 150° C. When the melting point is less than 70° C. and the compound is incorporated into the heat-sensitive adhesive layer, storage problems such as insufficient blocking resistance may generate at ordinary storage temperatures, and also undesirable adhesive ability often generates in the production process when the coating liquid of the heat-sensitive adhesive material is coated and dried on supports, for example. On the other hand, when the melting point is above 150° C., the effect to yield eutectic condition from the hot-melt substance is not significant.

The eutectic agent may be properly select from conventional substances without particular limitations. Dibenzyl oxalate compounds, expressed by the formula (6), are preferred from the viewpoint of sufficient effect to yield eutectic condition from the hot-melt substances and superior compatibility with thermoplastic compounds;

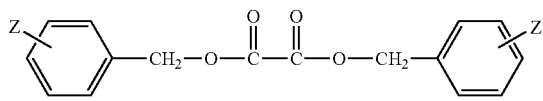

formula (6)

wherein Z in the formula (6) is one of hydrogen atom, halogen atoms, and alkyl groups. The halogen atoms and alkyl groups may be the same as those of formula (1) described above.

Specific examples of the dibenzyl oxalate compounds, expressed by the formula (6), include di-p-methylbenzyloxalate, di-p-ethylbenzyloxalate, di-p-chlorobenzyloxalate, and dibenzyloxalate. These may be used alone or in combination.

The heat-sensitive adhesive layer may include, in addition to the ingredients described above, inorganic materials such as titanium oxide, alumina, colloidal silica, kaolin, and talc; or organic materials such as metal stearates, paraffins, natural waxes, synthetic waxes, natural fats and oils, and polystyrene powder in order to prevent the blocking, and also the other optional ingredients such as dispersants, defoamers, and thickeners.

The heat-sensitive adhesive layer may be properly formed by conventional methods without particular limitations, and may be formed by a coating method using a coating liquid that contains the desirable ingredients, for example.

The coating method may be one of blade coating methods, gravure coating methods, gravure offset coating methods, bar coating methods, roll coating methods, knife coating methods, air knife coating methods, comma coating methods, U-comma coating methods, AKKU coating methods, smoothing coating methods, micro gravure coating methods, reverse roll coating methods, 4-roll or 5-roll coating methods, dip coating methods, drop-curtain coating methods, slide coating methods, and die coating methods.

With respect to drying conditions at coating and printing processes, the temperature should be within a range where the hot-melt substance and the eutectic agent do not melt. The drying may be carried out by use of hot gas flow, infrared ray, microwave, or radio-frequency wave.

The coated amount of the coating liquid of the heat-sensitive adhesive layer is preferably 5 $g/m^2$ to 30 $g/m^2$ after drying, more preferably is 5 $g/m^2$ to 20 $g/m^2$. When the coated amount of the coating liquid is less than 5 $g/m^2$, the adhesive strength is insufficient while the adhesion is carried out through heating, and/or the blocking resistance is poor due to the thermoplastic resin having a lower glass transition temperature in the underlayer; and when the coated amount is over 30 $g/m^2$, the heat insulation of the underlayer is lower and the production cost is undesirably higher.

Preferably, the total thickness of the underlayer and the heat-sensitive adhesive layer is 13 μm to 30 μm. Preferably, the ratio of the thickness (T1) of the heat-sensitive adhesive layer to the thickness (T2) of the underlayer (T1/T2) is 0.3 to 0.7. When the total thickness is less than 13 μm, the adhesive ability is likely to be insufficient with respect to rough surface such as of cardboards; and when the thickness exceeds 30 μm, the underlayer and the heat-sensitive adhesive layer often generate interlaminar peeling and/or innerlayer breakage. Further, the ratio T1/T2 of 0.3 to 0.7 may decrease the activation energy still more. The thicker is the thickness of the heat-sensitive adhesive layer, the more mount of activation energy is required in general; therefore, the ratio T1/T2 of above 0.7 tends to heat-shrinkage of films or synthetic papers of supports due to excessive amount of activation energy. On the other hand, the ratio T1/T2 of below 0.3 often leads to remarkably lower tackiness due to less or no anchor effect with irregular surface of adherends.

The heat-sensitive adhesive materials according to the present invention, having the constitution described above, may represent sufficient pressure-sensitive adhesive strength with respect to various adherends in particular to those having rough surface such as cardboards or polyolefin wraps, and also may exhibit thermal activation with lower energy and superior blocking resistance.

Preferably, the heat-sensitive adhesive materials according to the present invention comprise the protective layer and the recording layer on the support in this order, and the heat-sensitive adhesive layer is disposed the other side of the support. The heat-sensitive adhesive materials according to the present invention may further comprise the other layers depending on the requirements.

The recording layer may be properly selected depending on the application. Preferable examples of the recording layers are a thermosensitive recording layer, ink-receiving layer for hot-melt transfer recording, electrophotographic toner-receiving layer, silver halide-containing photographic recording layer, and inkjet ink-receiving layer. In particular, the heat-sensitive adhesive materials for thermosensitive recording that have a thermosensitive recording layer having a leuco dye and a developer, and the heat-sensitive adhesive materials for thermal transfer recording that have an ink-receiving layer for the hot-melt transfer recording are particularly preferable since these adhesives represent sufficient pressure-sensitive adhesive strength with respect to various adherends in particular to those having rough surface such as <Heat-Sensitive Adhesive Material for Thermosensitive Recording>

The thermosensitive recording layers of the heat-sensitive adhesive materials comprise a coloring agent, color developer, binder resin, and the other optional ingredients.

The leuco dye may be properly selected from conventional ones such as triphenylmethane dyes, fluoran dyes, phenothiazine dyes, auramine dyes, spiropyran dyes, and indolinophthalide dyes.

Specific examples of the leuco dyes include 3,3-bis(p-dimethylaminophenyl)phthalide, 3,3-bis(p-dimethylaminophenyl)-6-dimethylaminophthalide (or Crystal Violet Lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)phthalide, 3-cyclohexylamino-6-chlorofluoran, 3-dimethylamino-5,7-dimethylfluoran, 3-dimethylamino-7-chlorofluoran, 3-diethylamino-7-methylfluoran, 3-diethylamino-7,8-benzfluoran, 3-diethylamino-6-methyl-7-chlorofluoran, 3-(N-p-tolyl-N-ethylamino)-6-methyl-7-anilinofluoran, 3-pyrrolidino-6-methyl-7-anilinofluoran, 2-[N-(3'-trifluoromethylphenyl)amino]-6-diethylaminofluoran, 2-[3,6-bis(diethylamino)-9-(o-chloroanilino)]xanthyl-benzoic acid lactam, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-(N,N-diethylamino)-5-methyl-7-(N,N-dibenzyl-amino)fluoran, benzoyl leuco methylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl) phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl)phthalide, 3-diethylamino-6-methyl-7-(2',4'-dimethylanilino)fluoran, 3-(2'-methoxy-4'-dimethylaminophenyl)-3-(2'-hydroxy-4'-chloro-5'-methylphenyl)phthalide, 3-morphorino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p-toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyl-toluidino)-7-(p-n-butylanilino)fluoran, 3-(N-benzyl-N-cyclohexylamino)-5,6-benzo-7-α-naphthylamino-4',0-bromofluoran, 3-diethylamino-6-methyl-7-mesidino-4',5'-benzofluoran, 3-diethylamino-6-methyl-7-(2',4'-dimethylanilino)fluoran, 3-(p-dimethylaminophenyl)-3-[1,1-bis(p-dimethylaminophenyl)-ethylene-2-yl]phthalide, 3-(p-dimethylaminophenyl)-3-[1,1-bis(p-dimethylaminophenyl)-ethylene-2-yl]-6-dimethylaminophthalide, 3-(p-dimethylaminophenyl)-3-(1-p-dimethylaminophenyl-1-phenylethylene-2-yl)phthalide, 3-(p-dimethylaminophenyl)-3-(1-p-dimethylaminophenyl-1-p-chlorophenylethylene-2-yl)-6-dimethylaminophthalide, 3-(4'-dimethylamino-2'-methoxy)-3-(1"-p-dimethylaminophenyl-1"-p-chlorophenyl-1",3"-butadiene-4"-yl)benzophthalide, 3-(4'-dimethylamino-2'-benzyloxy)-3-(1"-p-dimethylaminophenyl-1"-phenyl-1",3"-butadiene-4"-yl)benzophthalide, 3-dimethylamino-6-dimethylamino-fluoren-9-spiro-3'-(6'-dimethylamino)phthalide, 3,3-bis[2-(p-dimethylaminophenyl)-2-(p-methoxyphenyl)ethenyl]-4,5,6,7-tetrachlorophthalide, 3-bis[1,1-bis(4-pyrrolidinophenyl)ethylene-2-yl]-5,6-dichloro-4,7-dibromophthalide, bis(p-dimethylaminostyryl)-1-naphthalenesulfonylmethane, 3-(N-methyl-N-propylamino)-6-methyl-7-anilidofluoran, 3-diethylamino-6-methyl-7-anilinofluoran, 3,6-bis(dimethylamino)fluorenespiro(9,3')-6'-dimethylaminophthalide, 3-diethylamino-6-chloro-7-anilinofluoran, 3-[N-ethyl-N-(2-ethoxypropyl)amino]-6-methyl-7-anilinofluoran, 3-(N-ethyl-N-tetrahydrofurfurylamino)-6-methyl-7-anilinofluoran, 3-diethylamino-6-methyl-7-mesidino-4',5'-benzofluoran, 3-N-methyl-N-isobutyl-6-methyl-7-anilinofluoran, and 3-N-methyl-N-isoamyl-6-methyl-7-anilinofluoran. These may be used alone or in combination.

The color developer may be properly selected without particular limitations from conventional electron-accepting compounds such as phenol compounds, thiophenol compounds, thiourea derivatives, organic acid and metal salts thereof.

Specific examples of the color developers include 4,4'-isopropylidenediphenol, 3,4'-isopropylidenediphenol, 4,4'-isopropylidenebis(o-methylphenol), 4,4'-sec-butylidenebisphenol, 4,4'-isopropylidenebis(o-tert-butylphenol), 4,4'-cyclohexylidenediphenol, 4,4'-isopropylidenebis(2-chlorophenol), 2,2'-methylenebis(4-methyl-6-tert-butylphenol), 4,4'-butylidenebis(6-tert-butyl-2-methyl)phenol, 1,1,3-tris(2-methyl-4-hydroxy-5-tert-butylphenyl)butane, 1,1,3-tris(2-methyl-4-hydroxy-5-cyclohexylphenyl)butane, 4,4'-thiobis(6-tert-butyl-2-methyl)phenol, 4,4'-diphenolsulfone, 4,2'-diphenolsulfone, 4-isopropoxy-4'-hydroxydiphenylsulfone, 4-benzyloxy-4'-hydroxydiphenylsulfone, 4,4'-diphenolsulfoxide, isopropyl-p-hydroxybenzoate, benzyl-p-hydroxybenzoate, benzyl-protocatechuate, stearylgallate, laurylgallate, octylgallate, 1,7-bis(4-hydroxyphenylthio)-3,5-dioxaheptane, 1,5-bis(4-hydroxyphenylthio)-3-oxapentane, 1,3-bis(4-hydroxyphenylthio)propane, 2,2'-methylenebis(4-methyl-6-tert-butylphenol), 1,3-bis(4-hydroxyphenylthio)propane, N,N'-diphenylthiourea, N,N'-di(m-chlorophenyl)thiourea, salicylanilide, 5-chloro-salicylanilide, salicyl-o-chloroanilide, 2-hydroxy-3-naphthoic acid, antipyrine complex of thiocyanic acid, zinc salt of 2-acetyloxy-3-naphthoic acid, 2-acetyloxy-1-naphthoic acid, 1-acetyloxy-2-naphthoic acid, metal salts of hydroxyl naphthoic acid (e.g. Zn, Al, Ca), bis(4-hydroxyphenyl)methylacetate, bis(4-hydroxyphenyl)benzylacetate, 4-[β-(p-methoxyphenoxy)ethoxy]salicylic acid, 1,3-bis(4-hydroxycumyl)benzene, 1,4-bis(4-hydroxycumyl)benzene, 2,4'-diphenolsulfone, 3,3'-diallyl-4,4'-diphenolsulfone, antipyrine complex of α,α-bis(4-hydroxyphenyl)-α-methyltoluene zinc thiocyanate, tetrabromobisphenol A, tetrabromobisphenol S, 4,4'-thiobis(2-methylphenol), 3,4-dihydroxyphenyl-4'-methyldiphenylsulfone, and 4,4'-thiobis(2-chlorophenol). These color developers may be used alone or in combination.

The amount of the color developer included in the thermosensitive recording layer may be properly selected depending on the application; preferably, the amount is 1 part by mass to 20 parts by mass, more preferably 2 parts by mass to 10 parts by mass based on 1 part by mass of the coloring agent.

The binder may be properly selected without particular limitations from conventional ones; examples thereof include polyvinyl alcohols; starch and its derivatives; cellulose derivatives such as methoxy cellulose, hydroxyethyl cellulose, carboxymethyl cellulose, methyl cellulose, and ethyl cellulose; water-soluble polymers such as sodium polyacrylate, polyvinylpyrrolidone, acrylamide-acrylate copolymer, acrylamide-acrylate-methacrylic acid terpolymer, alkali metal salts of styrene-maleic anhydride copolymer, alkali metal salts of isobutylene-maleic anhydride copolymer, polyacrylamide, sodium alginate, gelatin, and casein; emulsions such as polyvinyl acetate, polyurethane, polyacrylic acid, polyacrylate, polymethacrylate, polybutylmethacrylate, vinyl chloride-vinyl acetate copolymer, and ethylene-vinyl acetate copolymer; and latexes such as styrene-butadiene copolymer, and styrene-butadiene-acryl terpolymer. The binders may be used alone or in combination.

The thermosensitive recording layer may contain various hot-melt substances; examples thereof include fatty acids such as stearic acid and behenic acid; fatty acid amides such as stearic acid amide and palmitic acid amide; fatty acid metal salts such as zinc stearate, aluminum stearate, calcium stearate, zinc palmitate and zinc behenate; p-benzylbiphenyl, terphenyl, triphenyl methane, benzyl p-benzyloxybenzoate, β-benzyloxynaphthalene, phenyl-β-naphthoate, phenyl-1-hydroxy-2-naphthoate, methyl-1-hydroxy-2-naphthoate, diphenyl carbonate, dibenzyl terephthalate, dimethyl terephthalate, 1,4-dimethoxynaphthalene, 1,4-diethoxynaphthalene, 1,4-dibenzyloxynaphthalene, 1,2-diphenoxyethane, 1,2-bis(3-methylphenoxy)ethane, 1,2-bis(4-methylphenoxy) ethane, 1,4-diphenoxy-2-butene, 1,2-bis(4-methoxyphenylthio)ethane, dibenzoylmethane, 1,4-diphenylthiobutane, 1,4-diphenylthio-2-butene, 1,3-bis(2-vinyloxyethoxy)benzene, 1,4-bis(2-vinyloxyethoxy)benzene, p-(2-vinyloxyethoxy)biphenyl, p-aryloxybiphenyl, p-propagyloxybiphenyl, dibenzoyloxymethane, dibenzoyloxypropane, dibenzyldisulfide, 1,1-diphenylethanol, 1,1-diphenylpropanol, p-benzyloxybenzylalcohol, 1,3-phenoxy-2-propanol, N-octadecylcarbamoyl-p-methoxycarbonylbenzene, N-octadecylcarbamoylbenzene, dibenzyl oxalate, and 1,5-bis(p-methoxyphenyloxy)-3-oxapentane. These may be used alone or in combination.

The thermosensitive recording layer may contain various additional ingredients such as surfactants and lubricants depending on the application. Examples of the lubricants include higher fatty acids and derivatives thereof, higher fatty acid amide, higher fatty acid ester, animal waves, vegetable waxes, mineral waxes, and petroleum waxes.

The thermosensitive recording layer may be formed by way of conventional methods without particular limitations. For example, the a leuco dye and a color developer were individually divided by use of mills such as a ball mill, Atritor and sand mill to a particle size of 1 μm to 3 μm along with a binder and other ingredients. Then the leuco dye and, color developer and other optional ingredients such as loading material, hot melt substance or sensitivity enhancer, and dispersant are compounded and blended under a pre-determined formulation, thereby to prepare a coating liquid of the thermosensitive recording layer, and the coating liquid is coated on the support to form the thermosensitive recording layer.

The thickness of the thermosensitive recording layer depends on the composition of the thermosensitive recording layer and the application of heat-sensitive adhesive material in general; usually the thickness is preferably 1 μm to 50 μm, more preferably 3 μm to 20 μm.

<Heat-Sensitive Adhesive Material for Thermal Transfer Recording>

The ink-receiving layers for thermal transfer recording of the thermosensitive materials contain a filler, binder resin, waterproof agent, and the other optional ingredients.

The filler may be properly selected depending on the application; examples thereof include calcium carbonate, silica, titanium dioxide, aluminum hydroxide, clay, calcined clay, magnesium silicate, magnesium carbonate, white carbon, zinc oxide, barium sulfate, surface-treated calcium carbonate and silica, and fine powders of urea-formaldehyde resin, styrene-methacrylic acid copolymer, and polystyrene.

The binder resin may be properly selected depending on the application; examples thereof include polyvinyl alcohols; starch and its derivatives; cellulose derivatives such as methoxy cellulose, hydroxyethyl cellulose, carboxymethyl cellulose, methyl cellulose, and ethyl cellulose; water-soluble polymers such as sodium polyacrylate, polyvinylpyrrolidone, acrylamide-acrylate copolymer, acrylamide-acrylate-methacrylic acid terpolymer, alkali metal salts of styrene-maleic anhydride copolymer, alkali metal salts of isobutylene-maleic anhydride copolymer, polyacrylamide, sodium alginate, gelatin, and casein. These binders may be used alone or in combination.

The ratio of the filler and the water-soluble resin in the ink-receiving layers affects the blocking property. Preferably, the mass ratio of the filler to the water-soluble resin is 1:0.1 to 1:0.2 on the base of solid content.

The waterproof agent may be properly selected depending on the application; examples thereof include formaldehyde, glyoxal, chrome alum, melamine, melamine-formaldehyde resins, polyamide resins, and polyamide-epichlorohydrin resins.

The ratio of the waterproof agent and the water-soluble resin affects the blocking property. Preferably, the ratio of the waterproof agent is 0.3 part by mass to 0.5 part by mass to 1 part by mass of the water-soluble resin on the base of solid content. As such, the ink-receiving layer may contain the filler, water-soluble resin, and waterproof agent in various ratios. In addition, the surface-treated ink-receiving later by a calendaring process to a smoothness of 500 seconds or higher for example, may further enhance the printing quality beside the effect of the filler.

—Protective Layer—

The protective layer comprises a polyvinyl alcohol having a reactive carbonyl group and a hydrazide compound, and the other optional ingredients.

The protective layer, which comprises the polyvinyl alcohol having a reactive carbonyl group and the hydrazide compound as a crosslinking agent, may exhibit superior heat resistance and water resistance, and is hardly affected by pressure, temperature, and additional humidity; therefore, the blocking resistance may be remarkably enhanced.

The polyvinyl alcohol (PVA) having a reactive carbonyl group may be prepared by conventional methods, for example, by saponification of a polymer obtained by copolymerization of a vinyl monomer having a reactive carbonyl group with a fatty acid vinyl ester. Examples of the vinyl monomer having a reactive carbonyl group include a monomer having an ester residue and a monomer having an acetone group. Preferably, a vinyl monomer having a diacetone group is employed, specifically, diacetone acrylamide and metadiacetone acrylamide are preferably employed. Examples of the fatty acid vinyl ester include vinyl formate, vinyl acetate, and vinyl propionate. Among these, vinyl acetate is preferable.

The PVA having a reactive carbonyl group for use in the present invention may contain one or more copolymerizable vinyl monomers. Examples of the copolymerizable vinyl monomer include an acrylic ester, butadiene, ethylene, propylene, acrylic acid, methacrylic acid, maleic acid, maleic anhydride, and itaconic acid.

The content of the reactive carbonyl group within the PVA having a reactive carbonyl group is preferably 0.5% by mole to 20% by mole, more preferably 2% by mole to 10% by mole, based on total moles of monomer units of the polymer. When the content of the reactive carbonyl groups is less than 2% by mole, sufficient water resistance is hardly obtained in practice use, and when the content is more than 10 mole %, the water resistance tends to saturate and the production cost is unreasonably higher. Preferably, the PVA having a reactive carbonyl group has a polymerization degree of 300 to 3,000, more preferably 500 to 2,200, and preferably has a saponification degree of 80% or higher.

The hydrazide compound may be properly selected depending on the application; examples thereof include carbohydrazide, dihydrazide oxalate, hydrazide formate, hydrazide acetate, dihydrazide malonate, dihydrazide succinate, dihydrazide adipate, hydrazide azelate, dihydrazide sabacate, dihydrazide didodecanoate, dihydrazide maleate, hydrazide fumarate, dihydrazide itaconate, hydrazide benzonate, dihydrazide glutarate, hydrazide diglycolate, dihydrazide tartrate, dihydrazide malate, hydrazide isophthalate, dihydrazide terephthalate, dihydrazide 2,7-naphthoate, and hydrazide polyacrylate. The hydrazide compounds may be used alone or in combination. Among these, dihydrazide adipate is preferred from the standpoint of water resistance and safety.

Preferably, the content of the hydrazide compound is 5 parts by mass to 40 parts by mass, more preferably 15 parts by mass to 25 parts by mass based on the PVA having a reactive carbonyl group.

Preferably, the protective layer contains a filler. Preferably, the filler is of basic; examples thereof include aluminum hydroxide, calcium carbonate, talc, and basic silicates. Among these, aluminum hydroxide and calcium carbonate are preferred from the viewpoint of matching with thermal heads, e.g. residual substances adhered to the thermal head. Especially preferred is aluminum hydroxide owing to the moderate water solubility adapted to control the pH.

The filler included into the thermosensitive recording layer may be conventional ones; examples thereof include inorganic pigments such as calcium carbonate, zinc oxide, aluminum oxide, titanium dioxide, silica, aluminum hydroxide, barium sulfate, talc, kaolin, alumina, and clay, and conventional organic pigments, but not limited thereto. Preferably, the filler is one of acidic pigments, i.e. acidic in a condition of aqueous solution, such as silica, kaolin, and alumina from the viewpoint of water resistance or peeling resistance in water, particularly, silica is preferred from the viewpoint of coloring density.

The protective layer may be properly formed by way of conventional methods without particular limitations. For example, the protective may be formed by forming a coating liquid of the protective layer by a conventional method, and the coating liquid is coated on a recording layer to form the protective layer.

The thickness of the protective layer may be properly selected depending on the application; preferably, the thickness is 1.0 µm to 7.0 µm.

An intermediate layer may be provided between the support and the thermosensitive recording layer depending on requirements. The ingredients of the intermediate layer may be the loading materials, binders, hot-melt substances, surfactants, etc. described above.

The heat-sensitive adhesive material of the present invention may comprise a preprinting layer on the opposite side of the heat-sensitive adhesive layer or on the recording layer, or an eyemark printing as a sensing means on the surface or in the heat-sensitive adhesive material. These printings may be carried out by conventional printing methods such as UV printings, EB printings, and flexography. Preferably, the printing ink for thermosensitive recording papers is a UV curable ink owing to quick-drying property. The UV curable ink or UV ink is exemplified by UV inks of UV RCN, UV NVR, UV SOYA, U SOYA-RCN (T&K TOKA Co.); FD FL UV ink (by ToYo Ink MFG. Co.)

The heat-sensitive adhesive materials of the present invention may be properly utilized through being cut into a proper size before or after thermal activation of the heat-sensitive adhesive layer. The heat-sensitive adhesive material may contain at least a nick, which makes the heat-sensitive adhesive materials advantageous for utilizing to wide variety of applications such as labels and tags.

The shape of the heat-sensitive adhesive materials may be properly selected from labels, sheets, label sheets, rolls, and the like. In particular, the heat-sensitive adhesive materials are preferably wound on a cylindrical core into an elongated roll for convenience of storage and handling.

(Second Aspect of Heat-Sensitive Adhesive Material)

The heat-sensitive adhesive materials according to the present invention comprise, in the second aspect, a support, a thermosensitive recording layer, and a protective layer in this order, and on the other side of the support, a heat-sensitive adhesive layer that contains a thermoplastic resin and a hot-melt substance and the other optional layers.

The thermosensitive recording layer, usually formed from a thermosensitive recording layer and a protective layer, tends to block through softening or melting of the heat-sensitive adhesive layer in a specific condition of pressure, temperature, humidity, period, etc. when the thermosensitive recording layer is rolled up and the protective layer of the thermosensitive recording layer and heat-sensitive adhesive layer contact each other. The protective layer is typically formed from an inorganic filler and a resin in order to enhance chemical resistance and to match with heads.

When a polyvinyl alcohol having a reactive carbonyl group and a hydrazide compound as a crosslinking agent are employed for the resin of protective layers, the blocking resistance may be improved. Conventionally, starches, hydroxyethylcelluloses, methylcelluloses, carboxymethylcelluloses, gelatins, caseins, arabian gums, completely (or partially)-saponified polyvinyl alcohols, and carboxy-modified polyvinyl alcohols have been utilized for the resin of protective layers. However, the protective layers display insufficient thermal resistance and humidity resistance, thus typically turn into a softened condition when loads such as pressure, temperature, and humidity are applied while being overlapped with heat-sensitive adhesive layers, consequently yield a blocking condition with nearly melted heat-sensitive adhesive layers. On the contrary, the resin of the protective layer formed from the polyvinyl alcohol having a reactive carbonyl group and the hydrazide compound as a crosslinking agent may display significantly superior thermal resistance and water resistance, and may be far from adverse effect of pressure, temperature, and humidity. Further, the resins in the present invention may make the heat-sensitive adhesive layer hardly meltable. It is believed that these effects entirely and/or synergetically act to improve remarkably the blocking resistance.

Recently, printers for printing heat-sensitive adhesive materials, containing both of a thermosensitive recording layer and a heat-sensitive adhesive layer, have been produced commercially. When the thermosensitive recording layer is printed using a thermal head, and the resin in the protective layer at the side of thermosensitive recording is one other than the present invention, thus the thermal resistance and water resistance are inferior or poor, then the protective layer is likely to be put into a softened condition, thereby transporting troubles often generate due to increased friction with the thermal head. The heat-sensitive adhesive layer on the opposite side, contacting with a rotating-driving platen roll, is scrubbed by the platen roll, thereby the adhesive ability is induced. Higher temperature and higher humidity promote these phenomena significantly, thereby the process possibly falls into troubles such as label jam and transport stop. When the resin in the present invention is employed into the protective layer, the frictional force with the thermal head may be suppressed at the printing by virtue that the protective layer is free from softening, therefore, the heat-sensitive adhesive materials can be conveyed smoothly.

—Protective Layer—

The protective layer comprises a polyvinyl alcohol having a reactive carbonyl group, a hydrazide compound, a filler, and the other optional ingredients.

The polyvinyl alcohol having a reactive carbonyl group and the hydrazide compound may be the same as those of the heat-sensitive adhesive materials in the first aspect. The thermal resistance and the humidity resistance of the heat-sensitive adhesive layer may be improved by way of incorporating the polyvinyl alcohol having superior thermal resistance and humidity resistance into the heat-sensitive adhesive layer, thereby higher blocking resistance can be achieved. Further, the heat-sensitive adhesive layer itself displays superior thermal resistance and humidity resistance, thereby the heat-sensitive adhesive layer hardly generates adhesive ability even due to friction heat caused by rotation driving of the platen roll when the thermosensitive recording layer is printed, and also adhesive residues may be prevented and the decrease of adhesive strength may be suppressed since traveling ability is improved in terms of thermal heads when the heat-sensitive adhesive layer is thermally activated by means of the thermal heads.

Preferably, the filler in the protective layer is of basic; examples thereof are aluminum hydroxide, calcium carbonate, talc, alkaline silicates, and the like. From the viewpoint of matching with thermal heads or adhesive residues, aluminum hydroxide and calcium carbonate are preferable, in particular aluminum hydroxide is preferable since the pH can be easily controlled due to the appropriate water solubility.

—Heat-Sensitive Adhesive Layer—

The heat-sensitive adhesive layer comprises a thermoplastic resin, a hot-melt substance, a polyvinyl alcohol having a reactive carbonyl group, a hydrazide compound, and the other optional ingredients.

Examples of the thermoplastic resins include (meth)acrylate copolymers, styrene-isoprene copolymers, styrene-acrylate copolymers, styrene-butadiene copolymers, acrylonitrile-butadiene copolymers, ethylene-vinyl acetate copolymers, vinyl acetate-acrylate copolymers, ethylene-vinyl chloride copolymers, ethylene-acrylate copolymers, vinyl acetate-ethylene-vinyl chloride copolymers, vinyl acetate-ethylene-acrylate copolymers, vinyl acetate-ethylene-styrene copolymers, polybutadiene, and polyurethanes. Among these, various copolymers having a monomer unit of acrylates are preferred from the view point of adhesive property and weather resistance. These may be used alone or in combination.

The polyvinyl alcohol having a reactive carbonyl group and the hydrazide compound within the heat-sensitive adhesive layer may be the same as those of the heat-sensitive adhesive materials in the first aspect.

Preferably, the polyvinyl alcohol having a reactive carbonyl group is utilized for a dispersant of the hot-melt substance within the heat-sensitive adhesive layer, thereby the adhesive property can be enhanced, and superior blocking resistance and matching with printers can be achieved.

The hydrazide compound, employed as a crosslinking agent within the heat-sensitive adhesive layer, can improve the thermal resistance and the humidity resistance still more, and superior blocking resistance and sufficient matching with printers can be achieved.

The content of the polyvinyl alcohol having a reactive carbonyl group is preferably 3% by mass to 10% by mass, more preferably 5% by mass to 8% by mass of the thermoplastic resin within the heat-sensitive adhesive layer. When the content is more than 10% by mass, the adhesive property may adversely degrade even though the blocking resistance and matching with printers can be enhanced; when the content is less than 3% by mass, the blocking resistance and matching with printers may be insufficient particularly at higher temperatures and higher humidities even though the adhesive property may be unaffected.

Examples of the hot-melt substances include dicyclohexyl phthalate (melting point (hereinafter "m.p."): 65° C.), diphenyl phthalate (m.p.: 73° C.), N-cyclohexyl-p-toluenesulfonamide (m.p.: 86° C.), sucrose benzoate (m.p.: 98° C.), ethyleneglycol dibenzoate (m.p.: 70° C.), trimethylolethane tribenzoate (m.p.: 73° C.), pentaerythrite tetrabenzoate (m.p.: 95° C.), sucrose octaacetate (m.p.: 89° C.), and catechol dibenzoate (m.p.: 86° C.); hindered phenol compounds such as triethylene glycol bis[3-(3-t-butyl-4-hydroxy-5-methylphenyl)-propionate (m.p.: 77° C.), and 1,6-hexanediolbis [3-(3,5-di-t-butyl-4-hydroxyphenyl) propionate] (m.p.: 103° C.); triazole compounds such as 2-[5'-(1",1",3",3"-tetramethylbutyl)-2'-hydroxyphenyl]benzotriazole (m.p.: 103° C.), 2-[3',5'-di-(2",2"-dimethylpropyl)-2'-hydroxyphenyl] benzotriazole (m.p.: 80° C.), 2-(3'-t-butyl-5'-methyl-2'-hydroxyphenyl)-5-chlorobenzotriazole (m.p.: 138° C.), 2-(3,5-di-t-butyl-2-hydroxyphenyl)-5-chlorobenzotriazole (m.p.: 155° C.), 2-(5-methyl-2-hydroxyphenyl)benzotriazole (m.p.: 130° C.), and 2-(3,5-di-t-amyl-2-hydroxyphenyl)benzotriazole (m.p.: 80° C.).

Among these compounds, hindered phenol compounds and triazole compounds are preferable since the adhesive ability sustains for relatively long period upon heating thus adhesive property is stable. In some cases, plural compounds are utilized in order to sustain an amorphous condition after melting the active layer and to prolong the pot life of adhesive ability. These hot-melt substances and compounds are utilized in a condition of aqueous dispersion divided finely by means of wet or dry milling devices such as a ball mill, sand mill, paint shaker, Dino mill, Atritor, and Henschel mixer, alternatively are utilized through micro-capsulation by conventional methods. The particle diameter of hot-melt substances is preferably 10 µm or less, more preferably 5 µm or less, and still more preferably 0.7 µm to 2 µm.

Specific examples of tackifiers within heat-sensitive adhesive layers include terpene resins, fatty petroleum resins, aromatic petroleum resins, coumarone indene resins, styrene resins, phenol resins, terpene phenol resins, and rosin derivative resins.

The heat-sensitive adhesive layer may be included a filler depending on the application; examples of the fillers include inorganic materials such as carbonates, oxides, hydroxides, and sulfates of aluminum, zinc, calcium, magnesium, barium, and titanium; crude silica, zeolite, kaolin, and calcined kaolin; organic materials such as starches, styrene resins, polyolefin resins, melamine resins, acrylic resins, paraffins, crude waxes, and synthetic waxes.

In order to promote supercooled condition of hot-melt substances within heat-sensitive adhesive layers so as to display significant adhesive strength even at lower temperatures, a supercooling agent may be included into heat-sensitive adhesive layers in addition to the thermoplastic resins and hot-melt substances. Examples of the supercooling agents include naphthol derivatives such as 2-benzyloxynaphthalene, biphenyl derivatives such as methaterphenyl, acetylbiphenyl, p-benzylbiphenyl, and 4-allyloxybiphenyl; polyether compounds such as 1,2-bis(3-methylphenoxy)ethane, 2,2'-bis(4-methoxyphenoxy)-diethylether, and bis(4-methoxyphenyl)ether; diester carbonate and oxalate derivatives such as diphenyl carbonate, dibenzyl oxalate, di-(p-chlorobenzyl) oxalate, and di-(p-methylbenzyl)oxalate.

Among these, dibenzyl oxalate derivatives and biphenyl derivatives promote effectively the supercooled condition of the hot-melt substances.

The heat-sensitive adhesive layers may comprise heat-insulating hollow particles depending on the application. The hollow particles may be of polymers such as acrylic polymers and vinylidene chloride polymers. Further, particles with a perfectly spherical shape such as of polymethylmethacrylate may be employed.

The heat-sensitive adhesive layers may further comprise various additives such as film hardeners, antiseptics, dyes, UV ray absorbers, anti-oxidants, pH adjusters, and defoamers in addition to the ingredients described above depending on requirements.

—Thermosensitive Recording Layer, Support—

The thermosensitive recording layers and supports may be the same as those of heat-sensitive adhesive layers in the first aspect.

—Intermediate Layer—

Preferably, an intermediate layer containing an acrylic adhesive is disposed between the heat-sensitive adhesive layer and the support.

Examples of the thermoplastic resins utilized in the intermediate layers include (meth)acrylate copolymers, styrene-isoprene copolymers, styrene-acrylate copolymers, styrene-butadiene copolymers, acrylonitrile-butadiene copolymers, ethylene-vinyl acetate copolymers, vinyl acetate-acrylate copolymers, ethylene-vinyl chloride copolymers, ethylene-acrylate copolymers, vinyl acetate-ethylene-acrylate copolymers.

The intermediate layers may comprise various inorganic and organic fillers, hollow fillers having a balloon configuration, and waxes depending on the application.

The adherends, to which the heat-sensitive adhesive materials of the present invention are applied, may have wide variety of sizes, structures, and materials. Preferable examples of the materials include polyolefins such as polyethylene and polypropylene; resin plates of acrylic resins, polyethylene terephthalate resins, polystyrene resins, and nylon resins; metal plates of SUS and aluminum; paper products such as envelopments and cardboards, wraps of polyolefins, wraps of polyvinyl chloride, and nonwoven fabrics of polyethylene.

Among these, heat-sensitive adhesive materials of the second aspect can firmly adhere onto rough adherends such as cardboards or polyolefin wraps.

The method to thermally activate the heat-sensitive adhesive layer may be properly selected depending on the application; for example, methods by use of hot blast, heat rolls, and thermal heads are exemplified.

Among these, methods by use of thermal heads are recommendable. The methods may provide a benefit that recording on the thermosensitive recording layer and thermal activation of the heat-sensitive adhesive layer can be achieved through heating the both sides of the heat-sensitive adhesive material by use of conventional thermosensitive recording printers.

Example

The present invention will be illustrated in more detailed with reference to examples given below, but these are not to be construed as limiting the present invention. All percentages and parts are by mass unless indicated otherwise.

Preparation Example 1-1

Preparation of Underlayer Coating Liquid [A-1 Liquid]

A mixture containing 4.6 parts of amorphous silica (Nipjell AZ-200, solid content: 97%, volume average particle diameter: 2.5 µm, oil absorption: 320 ml/100 g, by Japan Silica Industries Co.), 24.4 parts of 2-ethylhexylacrylate-methylmethacrylate-styrene copolymer (Tg: −65° C., solid content: 55.4%, by Showa Highpolymer Co.), 0.1 part of surfactant (Dapro W-77, by Elementis Japan KK), and 70.9 parts of water was stirred and dispersed to prepare an underlayer coating liquid [A-1 liquid].

Preparation Example 1-2

Preparation of Underlayer Coating Liquid [A-2 Liquid]

A mixture containing 14.6 parts of plastic spherical hollow particles (1) (acrylonitrile-vinylidene chloride-methylmethacrylate copolymer, solid content: 41%, volume average particle diameter: 3.6 µm, hollow ratio: 90%), 21.7 parts of 2-ethylhexylacrylate-methylmethacrylate-styrene copolymer (Tg: −65° C., solid content: 55.4%, by Showa Highpolymer Co.), 0.1 part of surfactant (Dapro W-77, by Elementis Japan KK), and 63.6 parts of water was stirred and dispersed to prepare an underlayer coating liquid [A-2 liquid].

Preparation Example 1-3

Preparation of Underlayer Coating Liquid [A-3 Liquid]

A mixture containing 18.2 parts of plastic spherical hollow particles (2) (acrylonitrile-methacrylonitrile-isobonylmethacrylate copolymer, solid content: 33%, volume average particle diameter: 3.0 µm, hollow ratio: 91%), 24.0 parts of n-butylacrylate-methylacrylate-styrene copolymer (Tg: −62° C., solid content: 50%, by JSR Co.), 0.1 part of surfactant (Dapro W-77, by Elementis Japan KK), and 57.7 parts of water was stirred and dispersed to prepare an underlayer coating liquid [A-3 liquid].

Preparation Example 1-4

Preparation of Underlayer Coating Liquid [A-4 Liquid]

A mixture containing 22.0 parts of plastic spherical hollow particles (3) (acrylonitrile-vinylidene chloride-methylmethacrylate copolymer, solid content: 41%, volume average particle diameter: 3.2 µm, hollow ratio: 70%), 16.2 parts of 2-ethylhexylacrylate-methylmethacrylate-styrene copolymer (Tg: −5° C., solid content: 55.4%, by Showa Highpolymer Co.), 0.1 part of surfactant (Dapro W-77, by Elementis Japan KK), and 61.7 parts of water was stirred and dispersed to prepare an underlayer coating liquid [A-4 liquid].

Preparation Example 1-5

Preparation of Underlayer Coating Liquid [A-5 Liquid]

A mixture containing 30.0 parts of plastic spherical hollow particles (4) (acrylonitrile-vinylidene chloride-methylmethacrylate copolymer, solid content: 40%, volume average particle diameter: 1.5 µm, hollow ratio: 50%), 12.0 parts of 2-ethylhexylacrylate-n-butylacrylate-styrene copolymer (Tg: −30° C., solid content: 50.0%, by Showa Highpolymer Co.), 0.1 part of surfactant (Dapro W-77, by Elementis Japan KK), and 57.9 parts of water was stirred and dispersed to prepare an underlayer coating liquid [A-5 liquid].

Preparation Example 1-6

Preparation of Underlayer Coating Liquid [A-6 Liquid]

A mixture containing 6.1 parts of plastic spherical hollow particles (2) (acrylonitrile-methacrylonitrile-isobonylmethacrylate copolymer, solid content: 33%, volume average particle diameter: 3.0 µm, hollow ratio: 91%), 30.2 parts of ethylene-vinyl acetate-acryl copolymer (Tg: −20° C., solid content: 53%, by Sumika Chemtex Co.), 0.1 part of surfactant (Dapro W-77, by Elementis Japan KK), and 63.6 parts of water was stirred and dispersed to prepare an underlayer coating liquid [A-6 liquid].

Preparation Example 1-7

Preparation of Underlayer Coating Liquid [A-7 Liquid]

A mixture containing 27.3 parts of plastic spherical hollow particles (5) (acrylonitrile-methacrylonitrile-isobonylmethacrylate copolymer, solid content: 33%, volume average particle diameter: 6.0 µm, hollow ratio: 91%), 16.3 parts of 2-ethylhexylacrylate-methylmethacrylate-styrene copolymer (Tg: −65° C., solid content: 55.4%, by Showa Highpolymer Co.), 0.1 part of surfactant (Dapro W-77, by Elementis Japan KK), and 56.3 parts of water was stirred and dispersed to prepare an underlayer coating liquid [A-7 liquid].

Preparation Example 1-8

Preparation of Underlayer Coating Liquid [A-8 Liquid]

A mixture containing 18.2 parts of plastic spherical hollow particles (2) (acrylonitrile-methacrylonitrile-isobonylmethacrylate copolymer, solid content: 33%, volume average particle diameter: 3.0 µm, hollow ratio: 91%), 21.8 parts of n-butylacrylate-methylacrylate-methylmethacrylate copolymer (Tg: 0° C., solid content: 55%, by JSR Co.), 0.1 part of surfactant (Dapro W-77, by Elementis Japan KK), and 59.9 parts of water was stirred and dispersed to prepare an underlayer coating liquid [A-8 liquid].

Preparation Example 1-9

Preparation of Underlayer Coating Liquid [A-9 Liquid]

A mixture containing 44.6 parts of plastic spherical hollow particles (2) (acrylonitrile-methacrylonitrile-isobonylmethacrylate copolymer, solid content: 33%, volume average particle diameter: 3.0 µm, hollow ratio: 91%), 6.5 parts of n-butylacrylate-methylacrylate copolymer (Tg: −62° C., solid content: 50%, by JSR Co.), 0.1 part of surfactant (Dapro W-77, by Elementis Japan KK), and 48.8 parts of water was stirred and dispersed to prepare an underlayer coating liquid [A-9 liquid].

Preparation Example 1-10

Preparation of Underlayer Coating Liquid [A-10 Liquid]

A mixture containing 3 parts of plastic spherical hollow particles (2) (acrylonitrile-methacrylonitrile-isobonylmethacrylate copolymer, solid content: 33%, volume average particle diameter: 3.0 µm, hollow ratio: 91%), 34.0 parts of n-butylacrylate-methylacrylate copolymer (Tg: −62° C., solid content: 50%, by JSR Co.), 0.1 part of surfactant (Dapro W-77, by Elementis Japan KK), and 62.9 parts of water was stirred and dispersed to prepare an underlayer coating liquid [A-10 liquid].

Preparation Example 1-11

Preparation of Underlayer Coating Liquid [A-11 Liquid]

A mixture containing 90.3 parts of 2-ethylhexylacrylate-methylmethacrylate-styrene copolymer (Tg: −65° C., solid content: 55.4%, by Showa Highpolymer Co.), 0.1 part of surfactant (Dapro W-77, by Elementis Japan KK), and 9.6 parts of water was stirred and dispersed to prepare an underlayer coating liquid [A-11 liquid].

Preparation Example 1-12

Preparation of Underlayer Coating Liquid [A-12 Liquid]

A mixture containing 23.4 parts of plastic spherical hollow particles (1) (acrylonitrile-vinylidene chloride-methylmethacrylate copolymer, solid content: 41%, volume average particle diameter: 3.6 µm, hollow ratio: 90%), 10.0 parts of styrene-butadiene copolymer latex (Tg: +4° C.), 0.1 part of surfactant (Dapro W-77, by Elementis Japan KK), and 66.5 parts of water was stirred and dispersed to prepare an underlayer coating liquid [A-12 liquid].

Preparation Example 2-1

Preparation of Hot-Melt Substance Dispersion [B-1 Liquid]

A mixture containing 40.0 parts of 2-(2'-hydroxy-3'-t-butyl-5'-methylphenyl)-5-chlorobenzotriazole, (melting point ("m.p."): 138° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-1 liquid].

Preparation Example 2-2

Preparation of Hot-Melt Substance Dispersion [B-2 Liquid]

A mixture containing 40.0 parts of 2-(2'-hydroxy-3',5'-di-t-butylphenyl)-5-chlorobenzotriazole (m.p.: 152° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-2 liquid].

Preparation Example 2-3

Preparation of Hot-Melt Substance Dispersion [B-3 Liquid]

A mixture containing 40.0 parts of 2-(2'-hydroxy-3',5'-di-t-amylphenyl)benzotriazole (m.p.: 80° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-3 liquid].

Preparation Example 2-4

Preparation of Hot-Melt Substance Dispersion [B-4 Liquid]

A mixture containing 40.0 parts of benzyl p-hydroxybenzoate (m.p.: 113 to 115° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-4 liquid].

Preparation Example 2-5

Preparation of Hot-Melt Substance Dispersion [B-5 Liquid]

A mixture containing 40.0 parts of n-propyl p-hydroxybenzoate (m.p.: 99 to 100° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-5 liquid].

Preparation Example 2-6

Preparation of Hot-Melt Substance Dispersion [B-6 Liquid]

A mixture containing 40.0 parts of Anisoin (m.p.: 99 to 100° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-6 liquid].

Preparation Example 2-7

Preparation of Hot-Melt Substance Dispersion [B-7 Liquid]

A mixture containing 40.0 parts of 1-dihydroxy-2-phenyl-naphthoate (m.p.: 94 to 96° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-7 liquid].

Preparation Example 2-8

Preparation of Hot-Melt Substance Dispersion [B-8 Liquid]

A mixture containing 40.0 parts of 3-hydroxyphenyl benzoate (m.p.: 135° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.0 μm by use of a sand mill to prepare a hot-melt substance dispersion [B-8 liquid].

Preparation Example 3-1

Preparation of Eutectic Agent Dispersion [C-1 Liquid]

A mixture containing 40.0 parts of di-p-methylbenzyl oxalate (m.p.: 101° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.2 μm by use of a sand mill to prepare a hot-melt substance dispersion [C-1 liquid].

Preparation Example 3-2

Preparation of Eutectic Agent Dispersion [C-2 Liquid]

A mixture containing 40.0 parts of di-p-methylbenzyl oxalate (m.p.: 80° C.), 6.7 parts of polyvinyl alcohol (30% aqueous solution), 0.2 part of surfactant (Olfin PD-001, by Nissin Chemical Industry Co.), and 53.1 parts of water was milled and dispersed into an average particle diameter of 1.2 μm by use of a sand mill to prepare a hot-melt substance dispersion [C-2 liquid].

Preparation Example 4-1

Preparation of Coating Liquid of Heat-Sensitive Adhesive Material [D-1 Liquid]

A mixture containing 10 parts of n-butylacrylate-methylacrylate copolymer (Tg: −62° C., solid content: 50%, by JSR Co.), 6 parts of polymer rosin emulsion (softening temperature: 145° C., nonvolatile content: 50%), 37.5 parts of hot-melt substance dispersion [B-1 liquid], and 7 parts of eutectic agent dispersion [C-1 liquid] was uniformly blended to prepare a coating liquid of heat-sensitive adhesive material [D-1 liquid].

Preparation Example 4-2

Preparation of Coating Liquid of Heat-Sensitive Adhesive Material [D-2 Liquid]

A mixture containing 9 parts of 2-ethylhexylacrylate-methylmethacrylate-styrene copolymer (Tg: −65° C., solid content: 55.4%, by Showa Highpolymer Co.), 6 parts of terpene-phenol emulsion (softening temperature: 150° C., nonvolatile content: 50%), 37.5 parts of hot-melt substance dispersion [B-2 liquid], and 7 parts of eutectic agent dispersion [C-2 liquid] was uniformly blended to prepare a coating liquid of heat-sensitive adhesive material [D-2 liquid].

Preparation Example 4-3

Preparation of Coating Liquid of Heat-Sensitive Adhesive Material [D-3 Liquid]

A mixture containing 10 parts of n-butylacrylate-methylacrylate copolymer (Tg: −62° C., solid content: 50%, by JSR Co.), 6 parts of polymer rosin emulsion (softening temperature: 145° C., nonvolatile content: 50%), 19 parts of hot-melt substance dispersion [B-1 liquid], 19 parts of hot-melt substance dispersion [B-2 liquid], and 7 parts of eutectic agent dispersion [C-1 liquid] was uniformly blended to prepare a coating liquid of heat-sensitive adhesive material [D-3 liquid].

Preparation Example 4-4

Preparation of Coating Liquid of Heat-Sensitive Adhesive Material [D-4 Liquid]

A mixture containing 10 parts of 2-ethylhexylacrylate-n-butylacrylate-styrene copolymer (Tg: −30° C., solid content: 50.0%, by Showa Highpolymer Co.), 6 parts of terpene-phenol emulsion (softening temperature: 150° C., nonvolatile content: 50%), 19 parts of hot-melt substance dispersion [B-2 liquid], 19 parts of hot-melt substance dispersion [B-3 liquid], and 7 parts of eutectic agent dispersion [C-1 liquid] was uniformly blended to prepare a coating liquid of heat-sensitive adhesive material [D-4 liquid].

Preparation Example 4-5

Preparation of Coating Liquid of Heat-Sensitive Adhesive Material [D-5 Liquid]

A mixture containing 9 parts of 2-ethylhexylacrylate-methylmethacrylate-styrene copolymer (Tg: −5° C., solid content: 55.4%, by Showa Highpolymer Co.), 6 parts of polymer rosin emulsion (softening temperature: 145° C., nonvolatile content: 50%), 6 parts of polymer rosin emulsion (softening temperature: 145° C., nonvolatile content: 50%), and 37.5 parts of hot-melt substance dispersion [B-4 liquid] was uniformly blended to prepare a coating liquid of heat-sensitive adhesive material [D-5 liquid].

Preparation Example 4-6

Preparation of Coating Liquid of Heat-Sensitive Adhesive Material [D-6 Liquid]

A mixture containing 9.4 parts of ethylene-vinyl acetate-acryl copolymer (Tg: −20° C., solid content: 53%, by Sumika Chemtex Co.), 6 parts of terpene-phenol emulsion (softening temperature: 150° C., nonvolatile content: 50%), and 37.5 parts of hot-melt substance dispersion [B-5 liquid] was uniformly blended to prepare a coating liquid of heat-sensitive adhesive material [D-6 liquid].

Preparation Example 4-7

Preparation of Coating Liquid of Heat-Sensitive Adhesive Material [D-7 Liquid]

A mixture containing 10 parts of 2-ethylhexylacrylate-n-butylacrylate-styrene copolymer (Tg: −30° C., solid content: 50.0%, by Showa Highpolymer Co.), 6 parts of polymer rosin emulsion (softening temperature: 145° C., nonvolatile content: 50%), 19 parts of hot-melt substance dispersion [B-4 liquid], and 19 parts of hot-melt substance dispersion [B-5 liquid] was uniformly blended to prepare a coating liquid of heat-sensitive adhesive material [D-7 liquid].

Preparation Example 4-8

Preparation of Coating Liquid of Heat-Sensitive Adhesive Material [D-8 Liquid]

A mixture containing 10 parts of n-butylacrylate-methylacrylate copolymer (Tg: −62° C., solid content: 50%, by JSR Co.), 6 parts of terpene-phenol emulsion (softening temperature: 150° C., nonvolatile content: 50%), and 37.5 parts of hot-melt substance dispersion [B-6 liquid] was uniformly blended to prepare a coating liquid of heat-sensitive adhesive material [D-8 liquid].

Preparation Example 4-9

Preparation of Coating Liquid of Heat-Sensitive Adhesive Material [D-9 Liquid]

A mixture containing 9 parts of 2-ethylhexylacrylate-methylmethacrylate-styrene copolymer (Tg: −65° C., solid content: 55.4%, by Showa Highpolymer Co.), 6 parts of terpene-phenol emulsion (softening temperature: 150° C., nonvolatile content: 50%), and 37.5 parts of hot-melt substance dispersion [B-7 liquid] was uniformly blended to prepare a coating liquid of heat-sensitive adhesive material [D-9 liquid].

Preparation Example 4-10

Preparation of Coating Liquid of Heat-Sensitive Adhesive Material [D-10 Liquid]

A mixture containing 9 parts of 2-ethylhexylacrylate-methylmethacrylate-styrene copolymer (Tg: −65° C., solid content: 55.4%, by Showa Highpolymer Co.), 6 parts of terpene-phenol emulsion (softening temperature: 150° C., nonvolatile content: 50%), and 37.5 parts of hot-melt substance dispersion [B-8 liquid] was uniformly blended to prepare a coating liquid of heat-sensitive adhesive material [D-10 liquid].

Preparation Example 4-11

Preparation of Coating Liquid of Heat-Sensitive Adhesive Material [D-11 Liquid]

A mixture containing 10 parts of 2-ethylhexylacrylate-n-butylacrylate-styrene copolymer (Tg: −30° C., solid content: 50.0%, by Showa Highpolymer Co.), 6 parts of terpene-phenol emulsion (softening temperature: 150° C., nonvolatile content: 50%), 19 parts of hot-melt substance dispersion [B-7 liquid], 19 parts of hot-melt substance dispersion [B-8 liquid], and 7 parts of eutectic agent dispersion [C-1 liquid] was uniformly blended to prepare a coating liquid of heat-sensitive adhesive material [D-11 liquid].

Example 1

Preparation of Heat-Sensitive Adhesive Material

One-side coated paper having a basis mass of 80 g/m² (OK Adnithraff, by Oji Paper Co.) was provided for use as a support. The underlayer coating liquid [A-1] was coated on the non-coated side of the one-side coated paper in an amount of 15 g/m² after drying, then was dried to form an underlayer. Next, the coating liquid of heat-sensitive adhesive material [D-1] was coated in an amount of 10 g/m² after drying, then was dried to form a heat-sensitive adhesive layer; consequently, a heat-sensitive adhesive material was prepared.

Example 2

Preparation of Heat-Sensitive Adhesive Material

Preparation of Ink-Receiving Layer of Hot-Melt Transfer Recording Paper

A high quality paper, having a basis mass of 80 g/m², was provided for use as a support. A coating liquid was prepared that contained aluminum hydroxide particles as a filler of pigment having a volume average particle diameter of 0.4 μm to 0.5 μm and an alkaline salt of styrene-maleic anhydride copolymer as a binder resin in a ratio of filler/binder=1/0.2. The coating liquid was coated on the high quality paper by use of a wire bar to form an ink-receiving layer, thereby an ink-receiving sheet for hot-melt transfer was prepared.

Next, the underlayer coating liquid [A-2] was coated on the side of the support opposite to the ink-receiving layer in an amount of 5 g/m² after drying, then was dried to form an underlayer. Then the coating liquid of heat-sensitive adhesive material [D-2] was coated in an amount of 10 g/m² after drying, then was dried to form a heat-sensitive adhesive layer; consequently, a heat-sensitive adhesive material was prepared.

Example 3

Preparation of Heat-Sensitive Adhesive Material

Preparation of Coating Liquid for Forming Non-Expandable Heat-Insulating Layer [E Liquid]

A mixture containing 30 parts of fine-hollow-particle dispersion (copolymer resin based on vinylidene chloride-acrylonitrile, solid content: 32%, average particle diameter: 3.6 μm, hollow ratio: 92%), 10 parts of styrene-butadiene copolymer latex (Tg: +4° C.), 0.1 part of surfactant (Dapro W-77, by Elementis Japan KK), and 60 parts of water was stirred and dispersed to prepare a coating liquid for forming a non-expandable heat-insulating layer [E liquid].

Preparation of Coloring-Agent Dispersion [F Liquid]

A mixture containing 20 parts of 3-di-n-butylamino-6-methyl-7-anilinofluoran, 10 parts of polyvinyl alcohol (10% aqueous solution), and 70 parts of water was stirred and dispersed to prepare a coloring-agent dispersion [F liquid].

Preparation of Color-Developer Dispersion [G Liquid]

A mixture containing 10 parts of 4-isopropoxy-4'-hydroxyl-diphenylsulfone, 25 parts of polyvinyl alcohol (10% aqueous solution), 15 parts of calcium carbonate, and 50 parts of water was milled and dispersed into an average particle diameter of 1.5 μm by use of a sand mill to prepare a color-developer dispersion [G liquid].

Next, the coloring-agent dispersion [F liquid] and the color-developer dispersion [G liquid] were blended and stirred in a mass ratio of [F liquid]:[G liquid]=1:8 to prepare a coating liquid of thermosensitive recording layer [H liquid]. The coating liquid for forming a non-expandable heat-insulating layer [E liquid] was coated on an one-side coated paper having a basis mass of 80 g/m² in an amount of 4 g/m² after drying, and was dried to form a non-expandable heat-insulating layer. Then the coloring-agent dispersion [F liquid] was coated and dried on the non-expandable heat-insulating layer in an amount of 5 g/m² after drying, thereby to form a thermosensitive recording layer, then the thermosensitive recording layer was treated with super-calendering to 2,000 seconds in terms of Oken smoothness, consequently a thermosensitive recording paper was obtained that comprised the thermosensitive recording layer.

Next, the underlayer coating liquid [A-3] was coated on the side of the support opposite to the thermosensitive recording layer in an amount of 4 g/m² after drying, and was dried to form an underlayer. Then the coating liquid of heat-sensitive adhesive material [D-3] was coated on the under layer in an amount of 10 g/m² after drying, and was dried to form a heat-sensitive adhesive layer; consequently a heat-sensitive adhesive material was obtained.

Example 4

Preparation of Heat-Sensitive Adhesive Material

A heat-sensitive adhesive material was prepared in the same manner as Example 3, except that the underlayer coating liquid [A-4] was coated in an amount of 10 g/m² after drying, and was dried to form an underlayer, then the coating liquid of heat-sensitive adhesive material [D-3] was coated on the under layer in an amount of 15 g/m² after drying, and was dried to form a heat-sensitive adhesive layer.

Example 5

Preparation of Heat-Sensitive Adhesive Material

A heat-sensitive adhesive material was prepared in the same manner as Example 3, except that the underlayer coating liquid [A-5] was coated in an amount of 5 g/m² after drying, and was dried to form an underlayer, then the coating liquid of heat-sensitive adhesive material [D-4] was coated on the under layer in an amount of 10 g/m² after drying, and was dried to form a heat-sensitive adhesive layer.

Example 6

Preparation of Heat-Sensitive Adhesive Material

A heat-sensitive adhesive material was prepared in the same manner as Example 1, except that the underlayer coating liquid [A-6] was coated in an amount of 5 g/m² after drying, and was dried to form an underlayer, then the coating liquid of heat-sensitive adhesive material [D-5] was coated on the under layer in an amount of 10 g/m² after drying, and was dried to form a heat-sensitive adhesive layer.

Example 7

Preparation of Heat-Sensitive Adhesive Material

A heat-sensitive adhesive material was prepared in the same manner as Example 1, except that the underlayer coating liquid [A-6] was coated in an amount of 5 g/m² after drying, and was dried to form an underlayer, then the coating liquid of heat-sensitive adhesive material [D-6] was coated on the under layer in an amount of 10 g/m² after drying, and was dried to form a heat-sensitive adhesive layer.

Example 8

Preparation of Heat-Sensitive Adhesive Material

A heat-sensitive adhesive material was prepared in the same manner as Example 1, except that the underlayer coating liquid [A-6] was coated in an amount of 10 g/m² after drying, and was dried to form an underlayer, then the coating liquid of heat-sensitive adhesive material [D-3] was coated on the under layer in an amount of 10 g/m² after drying, and was dried to form a heat-sensitive adhesive layer.

Example 9

Preparation of Heat-Sensitive Adhesive Material

A heat-sensitive adhesive material was prepared in the same manner as Example 1, except that the underlayer coating liquid [A-7] was coated in an amount of 5 g/m² after drying, and was dried to form an underlayer, then the coating liquid of heat-sensitive adhesive material [D-3] was coated on the under layer in an amount of 10 g/m² after drying, and was dried to form a heat-sensitive adhesive layer.

Example 10

Preparation of Heat-Sensitive Adhesive Material

A heat-sensitive adhesive material was prepared in the same manner as Example 1, except that the underlayer coating liquid [A-9] was coated in an amount of 10 g/m² after drying, and was dried to form an underlayer, then the coating liquid of heat-sensitive adhesive material [D-7] was coated on the under layer in an amount of 10 g/m² after drying, and was dried to form a heat-sensitive adhesive layer.

Example 11

Preparation of Heat-Sensitive Adhesive Material

A heat-sensitive adhesive material was prepared in the same manner as Example 1, except that the underlayer coating liquid [A-9] was coated in an amount of 10 g/m² after drying, and was dried to form an underlayer, then the coating liquid of heat-sensitive adhesive material [D-8] was coated on the under layer in an amount of 10 g/m² after drying, and was dried to form a heat-sensitive adhesive layer.

Example 12

Preparation of Heat-Sensitive Adhesive Material

A heat-sensitive adhesive material was prepared in the same manner as Example 1, except that the underlayer coating liquid [A-10] was coated in an amount of 10 g/m² after drying, and was dried to form an underlayer, then the coating liquid of heat-sensitive adhesive material [D-3] was coated on the under layer in an amount of 10 g/m² after drying, and was dried to form a heat-sensitive adhesive layer.

Example 13

Preparation of Heat-sensitive Adhesive Material

A heat-sensitive adhesive material was prepared in the same manner as Example 1, except that the underlayer coating liquid [A-3] was coated in an amount of 10 g/m² after drying, and was dried to form an underlayer, then the coating liquid of heat-sensitive adhesive material [D-9] was coated on the under layer in an amount of 10 g/m² after drying, and was dried to form a heat-sensitive adhesive layer.

Example 14

Preparation of Heat-Sensitive Adhesive Material

A heat-sensitive adhesive material was prepared in the same manner as Example 1, except that the underlayer coating liquid [A-10] was coated in an amount of 10 g/m² after drying, and was dried to form an underlayer, then the coating liquid of heat-sensitive adhesive material [D-10] was coated on the under layer in an amount of 10 g/m² after drying, and was dried to form a heat-sensitive adhesive layer.

Example 15

Preparation of Heat-Sensitive Adhesive Material

A heat-sensitive adhesive material was prepared in the same manner as Example 1, except that the underlayer coating liquid [A-3] was coated in an amount of 10 g/m² after drying, and was dried to form an underlayer, then the coating liquid of heat-sensitive adhesive material [D-11] was coated on the under layer in an amount of 10 g/m² after drying, and was dried to form a heat-sensitive adhesive layer.

Example 16

Preparation of Heat-Sensitive Adhesive Material

A heat-sensitive adhesive material was prepared in the same manner as Example 3, except that the protective-layer coating liquid of the formulation indicated below was coated in an amount of 3 g/m² after drying, and was dried on the thermosensitive recording layer, then was treated with supercalendering to 5,000 seconds smoothness of the protective layer.

Preparation of Protective-Layer Coating Liquid

A mixture containing 40 parts of aluminum hydroxide dispersion (solid content: 50%), 6 parts of zinc stearate dispersion (solid content: 30%), 1 part of dioctyl sulfosuccinate aqueous solution (solid content: 5%), 200 parts of 10% aqueous solution of PVA having diacetone group (content of diacetone monomer unit: 4%, polymerization degree: 1,600, saponification degree: 98%, by Shin-Etsu Chemical Co.), 40 parts of hydrazide adipate aqueous solution (crosslinking agent, solid content: 10%), and 43 parts of water was blended to prepare a protective-layer coating liquid.

Comparative Example 1

Preparation of Heat-Sensitive Adhesive Material

A heat-sensitive adhesive material was prepared in the same manner as Example 1, except that the coating liquid of heat-sensitive adhesive material [D-1] was coated on the non-coated side of the one-side coated paper in an amount of 10 g/m² after drying, then was dried to form a heat-sensitive adhesive material.

Comparative Example 2

Preparation of Heat-Sensitive Adhesive Material

A heat-sensitive adhesive material was prepared in the same manner as Example 1, except that the underlayer coating liquid [A-8] was coated in an amount of 10 g/m² after drying, and was dried to form an underlayer, then the coating liquid of heat-sensitive adhesive material [D-1] was coated on the under layer in an amount of 10 g/m² after drying, and was dried to form a heat-sensitive adhesive layer.

Comparative Example 3

Preparation of Heat-Sensitive Adhesive Material

A heat-sensitive adhesive material was prepared in the same manner as Example 1, except that the underlayer coating liquid [A-11] was coated in an amount of 15 g/m² after drying, and was dried to form an underlayer, then the coating liquid of heat-sensitive adhesive material [D-1] was coated on the under layer in an amount of 10 g/m² after drying, and was dried to form a heat-sensitive adhesive layer.

Comparative Example 4

Preparation of Heat-Sensitive Adhesive Material

A heat-sensitive adhesive material was prepared in the same manner as Example 1, except that the underlayer coating liquid [A-12] was coated in an amount of 4 g/m² after drying, and was dried to form an underlayer, then the coating liquid of heat-sensitive adhesive material [D-3] was coated on the under layer in an amount of 15 g/m² after drying, and was dried to form a heat-sensitive adhesive layer.

TABLE 1

| | Support (basis mass) | Recording Layer (basis mass) | Underlayer Coating Liquid | Underlayer Coated Amount | Heat-sensitive Adhesive Layer Coating Liquid | Heat-sensitive Adhesive Layer Coated Amount |
|---|---|---|---|---|---|---|
| Ex. 1 | One-Side Coated Paper (80 g/m²) | None | A-1 | 15 g/m² | D-1 | 10 g/m² |
| Ex. 2 | High-Quality Paper (80 g/m²) | Melt-Transfer Layer (45 g/m²) | A-2 | 5 g/m² | D-2 | 10 g/m² |
| Ex. 3 | One-Side Coated Paper (80 g/m²) | Thermosensitive Recording Layer (9 g/m²) | A-3 | 4 g/m² | D-3 | 10 g/m² |
| Ex. 4 | One-Side Coated Paper (80 g/m²) | Thermosensitive Recording Layer (9 g/m²) | A-4 | 10 g/m² | D-3 | 15 g/m² |
| Ex. 5 | One-Side Coated Paper (80 g/m²) | Thermosensitive Recording Layer (9 g/m²) | A-5 | 5 g/m² | D-4 | 10 g/m² |
| Ex. 6 | One-Side Coated Paper (80 g/m²) | None | A-6 | 5 g/m² | D-5 | 10 g/m² |
| Ex. 7 | One-Side Coated Paper (80 g/m²) | None | A-6 | 5 g/m² | D-6 | 10 g/m² |
| Ex. 8 | One-Side Coated Paper (80 g/m²) | None | A-6 | 10 g/m² | D-3 | 10 g/m² |
| Ex. 9 | One-Side Coated Paper (80 g/m²) | None | A-7 | 5 g/m² | D-3 | 10 g/m² |
| Ex. 10 | One-Side Coated Paper (80 g/m²) | None | A-9 | 10 g/m² | D-7 | 10 g/m² |
| Ex. 11 | One-Side Coated Paper (80 g/m²) | None | A-9 | 10 g/m² | D-8 | 10 g/m² |
| Ex. 12 | One-Side Coated Paper (80 g/m²) | None | A-10 | 10 g/m² | D-3 | 10 g/m² |

TABLE 1-continued

|   | Support (basis mass) | Recording Layer (basis mass) | Underlayer Coating Liquid | Coated Amount | Heat-sensitive Adhesive Layer Coating Liquid | Coated Amount |
|---|---|---|---|---|---|---|
| Ex. 13 | One-Side Coated (80 g/m²) | None | A-3 | 10 g/m² | D-9 | 10 g/m² |
| Ex. 14 | One-Side Coated (80 g/m²) | None | A-10 | 10 g/m² | D-10 | 10 g/m² |
| Ex. 15 | One-Side Coated (80 g/m²) | None | A-3 | 10 g/m² | D-11 | 10 g/m² |
| Ex. 16 | One-Side Coated (80 g/m²) | Thermosensitive Recording Layer | A-3 | 4 g/m² | D-3 | 10 g/m² |
| Comp. Ex. 1 | One-Side Coated (80 g/m²) | None | None | None | D-1 | 10 g/m² |
| Comp. Ex. 2 | One-Side Coated (80 g/m²) | None | A-8 | 10 g/m² | D-1 | 10 g/m² |
| Comp. Ex. 3 | One-Side Coated (80 g/m²) | None | A-11 | 15 g/m² | D-1 | 10 g/m² |
| Comp. Ex. 4 | One-Side Coated (80 g/m²) | None | A-12 | 4 g/m² | D-3 | 15 g/m² |

The heat-sensitive adhesive materials of Examples 1 to 16 and Comparative Examples 1 to 4 were evaluated with respect to adhesive strength of immediately after production (hereinafter referring to "as-produced"), adhesive strength after a period (hereinafter referring to "as-aged"), and blocking property. The results are shown in Tables 3 to 5.

<Measurement of as-Produced Adhesive Strength>

Each of the heat-sensitive adhesive materials was cut into a rectangle of 25 mm×150 mm, and was thermally activated by means of a thermosensitive printing apparatus (TH-PMD, by Ohkura Electric Co.) under a condition of energy at head: 0.35 mJ/dot, 0.45 mJ/dot, and 0.5 mJ/dot, printing speed: 4 ms/line, platen pressure: 6 kgf/line. Then, the heat-sensitive adhesive material was laminated to an adhered of polyolefin wrap or cardboard in the long direction using a rubber roller at pressure 2 kg.

After one hour, the heat-sensitive adhesive material was peeled away under a condition of peeling angle: 180° and peeling velocity: 300 mm/min; the peeling strength was determined by a force gage (Model DPS-5, by Imada Co.) in a way that data were recorded at intervals of 0.1 second and the data were averaged in a unit of gf/25 mm. The measurements were carried out at an ordinary condition of temperature 23° C. and humidity 65%.

<Measurement of as-Aged Adhesive Strength>

Each of the heat-sensitive adhesive materials was cut into a rectangle of 25 mm×150 mm, and was thermally activated by means of a thermosensitive printing apparatus (TH-PMD, by Ohkura Electric Co.) under a condition of energy at head: 0.5 mJ/dot, printing speed: 4 ms/line, platen pressure: 6 kgf/line. Then, the heat-sensitive adhesive material was laminated to an adherent of polyolefin wrap or cardboard in the long direction using a rubber roller at pressure 2 kg.

After one week, the heat-sensitive adhesive material was peeled away under a condition of peeling angle: 180°, peeling velocity: 300 mm/min; the peeling strength was determined by a force gage (Model DPS-5, by Imada Co.) in a way that data were recorded at intervals of 0.1 second and the data were averaged in a unit of gf/25 mm. The measurements were carried out at an ordinary condition of temperature 23° C. and humidity 65%.

[Evaluation Criteria of Adhesive Strength of Polyolefin Wrap]
A: 1500 gf/25 mm or higher
B: 1000 gf/25 mm to 1500 gf/25 mm
C: 700 gf/25 mm to 1000 gf/25 mm
D: less than 700 gf/25 mm

[Evaluation Criteria of Adhesive Strength of Cardboard]
A: 700 gf/25 mm or higher
B: 500 gf/25 mm to 700 gf/25 mm
C: 300 gf/25 mm to 500 gf/25 mm
D: less than 300 gf/25 mm <Evaluation of Blocking Property>

The surface of the adhesive layer and the opposite surface of the respective heat-sensitive adhesive materials were contacted and allowed to stand 24 hours under a condition of pressure: 200 gf/cm², temperature: 50° C., and humidity: dry. Thereafter, the respective heat-sensitive adhesive materials were allowed to stand at room temperature, then were peeled and evaluated as to the blocking property based on the ranks and standard criteria shown below.

TABLE 2

| Rank | Trap | Peeling Sound | Point-like Transfer | Falling Off |
|---|---|---|---|---|
| 10 | one's own weight | | | |
| 9 | some | no-sound | | |
| 8 | significant | some | | |
| 7 | | significant | | |
| 6 | | | partial | |
| 5 | | | 30 to 50% | |
| 4 | | | 50% to entire | |
| 3 | | | | partial |
| 2 | | | | 30 to 50% |
| 1 | | | | 50% to entire |

[Evaluation Criteria]
A: rank 10
B: rank 8 to 9
C: rank 6 to 7
D: rank 5 or less

TABLE 3

Adhesive Property (gf/25 mm) Polyolefin Wrap

| | 0.30 mJ/dot (as-produced) | Evaluation | 0.40 mJ/dot (as-produced) | Evaluation | 0.50 mJ/dot (as-produced) | Evaluation | As-Aged (one week) | Evaluation |
|---|---|---|---|---|---|---|---|---|
| Ex. 1 | 960 | C | 1280 | B | 1440 | B | 1535 | A |
| Ex. 2 | 1420 | B | 1580 | A | 1570 | A | 1490 | B |
| Ex. 3 | 1650 | A | 1630 | A | 1640 | A | 1670 | A |
| Ex. 4 | 1220 | B | 1580 | A | 1570 | A | 1465 | B |
| Ex. 5 | 1030 | B | 1350 | A | 1600 | A | 1390 | B |
| Ex. 6 | 1290 | B | 1650 | A | 1680 | A | 1760 | A |
| Ex. 7 | 1370 | B | 1650 | A | 1680 | A | 1725 | A |
| Ex. 8 | 1400 | B | 1750 | A | 1760 | A | 1830 | A |
| Ex. 9 | 930 | C | 960 | C | 945 | C | 1070 | C |
| Ex. 10 | 760 | C | 770 | C | 745 | C | 845 | C |
| Ex. 11 | 800 | C | 825 | C | 810 | C | 890 | C |
| Ex. 12 | 1050 | B | 1560 | A | 1610 | A | 1885 | A |
| Ex. 13 | 1610 | A | 1575 | A | 1590 | A | 1680 | A |
| Ex. 14 | 890 | C | 1380 | B | 1615 | A | 1925 | A |
| Ex. 15 | 1585 | A | 1605 | A | 1590 | A | 1655 | A |
| Ex. 16 | 1590 | A | 1700 | A | 1680 | A | 1680 | A |
| Comp. Ex. 1 | 500 | D | 640 | D | 720 | C | 715 | C |
| Comp. Ex. 2 | 600 | D | 710 | C | 725 | C | 700 | C |
| Comp. Ex. 3 | 850 | C | 1210 | B | 1450 | B | 1620 | A |
| Comp. Ex. 4 | 650 | D | 720 | C | 715 | C | 745 | C |

TABLE 4

Adhesive Property (gf/25 mm) Cardboard

| | 0.30 mJ/dot (as-produced) | Evaluation | 0.40 mJ/dot (as-produced) | Evaluation | 0.50 mJ/dot (as-produced) | Evaluation | As-Aged (one week) | Evaluation |
|---|---|---|---|---|---|---|---|---|
| Ex. 1 | 400 | C | 520 | B | 610 | B | 680 | B |
| Ex. 2 | 620 | B | 630 | B | 610 | B | 450 | C |
| Ex. 3 | 710 | A | 690 | B | 700 | A | 640 | B |
| Ex. 4 | 570 | B | 710 | A | 690 | B | 415 | C |
| Ex. 5 | 500 | B | 615 | B | 720 | A | 400 | C |
| Ex. 6 | 650 | B | 730 | A | 735 | A | 810 | A |
| Ex. 7 | 615 | B | 660 | B | 650 | B | 690 | B |
| Ex. 8 | 630 | B | 680 | B | 685 | B | 745 | A |
| Ex. 9 | 430 | C | 415 | C | 420 | C | 395 | C |
| Ex. 10 | 380 | C | 395 | C | 370 | C | 350 | C |
| Ex. 11 | 415 | C | 405 | C | 420 | C | 395 | C |
| Ex. 12 | 525 | B | 730 | A | 715 | A | 855 | A |
| Ex. 13 | 680 | B | 665 | B | 670 | B | 705 | A |
| Ex. 14 | 435 | C | 650 | B | 730 | A | 790 | A |
| Ex. 15 | 640 | B | 655 | B | 645 | B | 640 | B |
| Ex. 16 | 750 | A | 740 | A | 740 | A | 670 | B |
| Comp. Ex. 1 | 200 | D | 250 | D | 280 | D | 90 | D |
| Comp. Ex. 2 | 230 | D | 285 | D | 290 | D | 95 | D |
| Comp. Ex. 3 | 350 | C | 480 | C | 580 | B | 610 | B |
| Comp. Ex. 4 | 200 | D | 290 | D | 295 | D | 150 | D |

TABLE 5

| | Blocking Property (rank) | Evaluation |
|---|---|---|
| Ex. 1 | 9 | B |
| Ex. 2 | 10 | A |
| Ex. 3 | 10 | A |
| Ex. 4 | 10 | A |
| Ex. 5 | 10 | A |
| Ex. 6 | 9 | B |
| Ex. 7 | 10 | A |
| Ex. 8 | 9 | B |

TABLE 5-continued

| | Blocking Property(rank) | Evaluation |
|---|---|---|
| Ex. 9 | 10 | A |
| Ex. 10 | 10 | A |
| Ex. 11 | 10 | A |
| Ex. 12 | 8 | B |
| Ex. 13 | 10 | A |
| Ex. 14 | 9 | B |
| Ex. 15 | 10 | A |
| Ex. 16 | 10 | A |
| Comp. Ex. 1 | 10 | A |
| Comp. Ex. 2 | 10 | A |
| Comp. Ex. 3 | 2 | D |
| Comp. Ex. 4 | 10 | A |

The results of Tables 3 to 5 show that Comparative Example 1 in which no underlayer exists, Comparative Example 2 in which Tg of the thermoplastic resin within the underlayer is 0° C., and Comparative Example 4 in which Tg of the thermoplastic resin within the underlayer is +4° C. come down to poor adhesive property of as-aged in particular. Comparative Example 3 in which the underlayer contains no hollow filler come down to inferior blocking resistance.

On the contrary, Examples 1 to 16 have demonstrated superior adhesive property, substantially no decrease of adhesive strength with time, and proper blocking resistance. Example 16 has demonstrated that blocking resistance is enhanced when the protective layer contains a polyvinyl alcohol having a reactive carbonyl group and a hydrazide compound.

Example 17

Preparation of Dispersion A

A mixture containing 100 parts of 2-(3'-t-butyl-5'-methyl-2'-hydroxyphenyl)-5-chlorobenzotriazole, 50 parts of 10% solution of polyvinyl alcohol, and 200 parts of water was uniformly blended and dispersed into an average particle size of 1.0 µm by use of a ball mill to prepare dispersion A.

Preparation of Dispersion B

A mixture containing 100 parts of di(p-methylbenzyl)oxalate, 50 parts of 10% solution of polyvinyl alcohol, and 200 parts of water was uniformly blended and dispersed into an average particle size of 1.0 µm by use of a ball mill to prepare dispersion B.

Preparation of Coating Liquid C of Heat-Sensitive Adhesive Layer

A mixture containing 100 parts of thermoplastic resin emulsion AP5570 (solid content: 55%, Tg: −65° C., by Showa Highpolymer Co.), 70 parts of tackifier emulsion E100 (solid content: 50%, softening temperature: 145° C., by Arakawa Chemical Industries Ltd.), 540 parts of dispersion A, 150 parts of dispersion B, and 130 parts of water was stirred and blended sufficiently to prepare a coating liquid C of heat-sensitive adhesive layer.

Preparation of Underlayer Coating Liquid D

A mixture containing 100 parts of Ropaque HP-91 of hollow particle emulsion (hollow ratio: 50%, solid content: 27.5%, by Rohm and Hass Co.), 220 parts of polymer resin emulsion AD83 (based on ethylene-vinyl acetate, solid content: 56%, Tg: −2° C., by Showa Highpolymer Co.), and 440 parts of water was stirred and blended sufficiently to prepare an underlayer coating liquid D. The ratio of the polymer resin to the hollow particles within the underlayer was 22.2%.

Preparation of Heat-Sensitive Adhesive Material E

The underlayer coating liquid D was coated and dried on a side of thermal paper type 120LCS-O (by Ricoh Co., (support: Yupo Synthetic Film by Ojiyuka Co.)) opposite to the thermosensitive recording layer to a thickness of 20.0 µm by use of a wire bar. Then the coating liquid C of heat-sensitive adhesive layer was coated and dried on the underlayer to a thickness of 15.0 µm after drying, thereby a heat-sensitive adhesive material E was prepared that had a total thickness of 35.0 µm.

Example 18

A heat-sensitive adhesive material of Example 18 was prepared in the same manner as Example 17, except that the polymer resin emulsion AD83 (based on ethylene-vinyl acetate, solid content: 56%, Tg: −2° C., by Showa Highpolymer Co.) for the underlayer was changed into FREX751 (based on ethylene-vinyl acetate, solid content: 50%, Tg: −15° C., by Sumitomo Chemical Co.). The ratio of the polymer resin to the hollow particles within the underlayer was 22.2%.

Example 19

A heat-sensitive adhesive material of Example 19 was prepared in the same manner as Example 18, except that the thickness of the underlayer was changed into 9.0 µm, the thickness of the heat-sensitive adhesive layer was changed into 6.0 µm, thus the total thickness was changed into 15.0 µm. The ratio of the polymer resin to the hollow particles within the underlayer was 22.2%.

Example 20

A heat-sensitive adhesive material of Example 20 was prepared in the same manner as Example 18, except that the thickness of the underlayer was changed into 13.0 µm, the thickness of the heat-sensitive adhesive layer was changed into 7.0 µm, thus the total thickness was changed into 20.0 µm. The ratio of the polymer resin to the hollow particles within the underlayer was 22.2%.

Example 21

A heat-sensitive adhesive material of Example 21 was prepared in the same manner as Example 18, except that the thickness of the underlayer was changed into 21.0 µm, the thickness of the heat-sensitive adhesive layer was changed into 7.0 µm, thus the total thickness was changed into 28.0

μm. The ratio of the polymer resin to the hollow particles within the underlayer was 22.2%.

Example 22

A heat-sensitive adhesive material of Example 22 was prepared in the same manner as Example 21, except that Ropaque HP-91 of hollow particle emulsion (hollow ratio: 50%, solid content: 27.5%, by Rohm and Hass Co.) of the underlayer was changed into R300 (hollow ratio: 90%, solid content: 33%, by Matsumoto Yushi-Seiyaku Co.). The ratio of the polymer resin to the hollow particles within the underlayer was 22.2%.

Example 23

Preparation of Underlayer Coating Liquid F

A mixture containing 100 parts of hollow particles R300 (hollow ratio: 90%, solid content: 33%, by Matsumoto Yushi-Seiyaku Co.), 230 parts of polymer resin emulsion FREX751 (based on ethylene-vinyl acetate, solid content: 50%, Tg: −15° C., by Sumitomo Chemical Co.), and 410 parts of water was stirred and blended sufficiently to prepare an underlayer coating liquid F. The ratio of the polymer resin to the hollow particles within the underlayer was 28.6%.

Then, the heat-sensitive adhesive material of Example 23 was prepared in the same manner as Example 22, except that the underlayer coating liquid was changed into the underlayer coating liquid F.

Example 24

Preparation of Underlayer Coating Liquid G

A mixture containing 100 parts of hollow particles R300 (hollow ratio: 90%, solid content: 33%, by Matsumoto Yushi-Seiyaku Co.), 130 parts of polymer resin emulsion FREX751 (based on ethylene-vinyl acetate, solid content: 50%, Tg: −15° C., by Sumitomo Chemical Co.), and 260 parts of water was stirred and blended sufficiently to prepare an underlayer coating liquid G. The ratio of the polymer resin to the hollow particles within the underlayer was 50.0%.

Then, the heat-sensitive adhesive material of Example 24 was prepared in the same manner as Example 22, except that the underlayer coating liquid was changed into the underlayer coating liquid G.

Example 25

Preparation of Underlayer Coating Liquid H

A mixture containing 100 parts of hollow particles R300 (hollow ratio: 90%, solid content: 33%, by Matsumoto Yushi-Seiyaku Co.), 60 parts of polymer resin emulsion FREX751 (based on ethylene-vinyl acetate, solid content: 50%, Tg: −15° C., by Sumitomo Chemical Co.), and 155 parts of water was stirred and blended sufficiently to prepare an underlayer coating liquid H. The ratio of the polymer resin to the hollow particles within the underlayer was 111.0%.

Then, the heat-sensitive adhesive material of Example 25 was prepared in the same manner as Example 22, except that the underlayer coating liquid was changed into the underlayer coating liquid H.

Example 26

Preparation of Underlayer Coating Liquid I

A mixture containing 100 parts of hollow particles R300 (hollow ratio: 90%, solid content: 33%, by Matsumoto Yushi-Seiyaku Co.), 120 parts of polymer resin emulsion AP5570 (solid content: 55%, Tg: −65° C., by Showa Highpolymer Co.), and 270 parts of water was stirred and blended sufficiently to prepare an underlayer coating liquid I. The ratio of the polymer resin to the hollow particles within the underlayer was 50.0%.

Then, the heat-sensitive adhesive material of Example 26 was prepared in the same manner as Example 24, except that the underlayer coating liquid was changed into the underlayer coating liquid I.

Example 27

Preparation of Underlayer Coating Liquid J

A mixture containing 100 parts of hollow particles R300 (hollow ratio: 90%, solid content: 33%, by Matsumoto Yushi-Seiyaku Co.), 120 parts of polymer resin emulsion AP5570 (solid content: 55%, Tg: −65° C., by Showa Highpolymer Co.), 160 parts of acrylic-silicone resin emulsion US224 (solid content: 40%, Tg: 10° C., by Toagosei Co.), and 440 parts of water was stirred and blended sufficiently to prepare an underlayer coating liquid J. The ratio of the polymer resin to the hollow particles within the underlayer was 50.0%.

Then, the heat-sensitive adhesive material of Example 27 was prepared in the same manner as Example 26, except that the underlayer coating liquid was changed into the underlayer coating liquid J.

Comparative Example 5

Preparation of Underlayer Coating Liquid K

A mixture containing 100 parts of Ropaque HP-91 of hollow particle emulsion (hollow ratio: 50%, solid content: 27.5%, by Rohm and Hass Co.), 410 parts of polyvinyl alcohol aqueous solution (solid content: 30%, Tg: 100° C. or more, by Kuraray Co.), and 240 parts of water was stirred and blended sufficiently to prepare an underlayer coating liquid K.

Then, the heat-sensitive adhesive material of Comparative Example 5 was prepared in the same manner as Example 17, except that the underlayer coating liquid was changed into the underlayer coating liquid K.

Comparative Example 6

The heat-sensitive adhesive material of Comparative Example 6 was prepared in the same manner as Example 17, except that Ropaque HP-91 of hollow particle emulsion (hollow ratio: 50%, solid content: 27.5%, by Rohm and Hass Co.)

of the underlayer coating liquid was changed into Almatex SPMM-47BF (hollow ratio: 0%, solid content: 47.5%, by Mitsui Chemical Co.).

Comparative Example 7

The heat-sensitive adhesive material of Comparative Example 7 was prepared in the same manner as Example 17, except that no underlayer was provided.

The resultant heat-sensitive adhesive materials were evaluated as follows in terms of various properties. The results are shown in Tables 6 to 8.

<Thermal Activation Condition>

Each of the heat-sensitive adhesive materials was sized into width 4 cm×length 10 cm, and was thermally activated through conducting all dots under the following conditions. The series of measurements were conducted in an environmental condition of 22° C. and 65% RH.
 Thermal head: TH-0976SP (by TEC Co.), 8 dot/mm
 Resistance: 500 ohms
 Activation energy: 0.30, 0.45, 0.60 mJ/dot
 Printing Speed: 100 mm/sec
 Platen pressure: 6 kgf/line <Thermal Shrinkage of Heat-Sensitive Adhesive Material Label>

The heat-sensitive adhesive material labels were thermally activated, and the shrinkage due to higher temperatures was visually observed and evaluated in accordance with the following rank indexes.

[Rank Index]
 A: no thermal shrinkage of label was observable
 B: some thermal shrinkage of label was observable
 C: remarkable thermal shrinkage of label was observable <Measurement of Adhesive Strength>

An activated surface of thermally activated heat-sensitive adhesive material labels is laminated to an adherent of polyolefin wrap or cardboard by use of a rubber roller at 2 kg pressure, and peeled after two minutes under a condition of peeling angle 180° and peeling speed 300 mm/min. The averaged resistance to peel away is obtained as a value in a unit of gf/40 mm. The series of measurements were conducted in an environmental condition of 22° C. and 65% RH.

[Evaluation Criteria of Adhesive Strength of Polyolefin Wrap]
 A: 1500 gf/40 mm or higher
 B: 1000 gf/40 mm to 1500 gf/40 mm
 C: 700 gf/40 mm to 1000 gf/40 mm
 D: less than 700 gf/40 mm

[Evaluation Criteria of Adhesive Strength of Cardboard]
 A: 700 gf/40 mm or higher
 B: 500 gf/40 mm to 700 gf/40 mm
 C: 300 gf/40 mm to 500 gf/40 mm
 D: less than 300 gf/40 mm <Residual Adhesive>

The residual adhesive that remained on the cardboard upon peeling the label was visually observed at the measurement of the adhesive strength, and the residual adhesive was evaluated in accordance with the following rank indexes.

[Rank Index]
 A: no residual adhesive was observable
 B: some residual adhesive was observable
 C: remarkable residual adhesive was observable

TABLE 6

| | Adhesive Property (gf/40 mm) Polyolefin Wrap | | | | | |
|---|---|---|---|---|---|---|
| | 0.30 mJ/dot (as-produced) | Evaluation | 0.45 mJ/dot (as-produced) | Evaluation | 0.60 mJ/dot (as-produced) | Evaluation |
| Ex. 17 | 660 | D | 980 | C | 1160 | B |
| Ex. 18 | 920 | C | 1050 | B | 1100 | B |
| Ex. 19 | 1050 | B | 1100 | B | 1390 | B |
| Ex. 20 | 1100 | B | 1220 | B | 1380 | B |
| Ex. 21 | 1490 | B | 1880 | A | 2330 | A |
| Ex. 22 | 1980 | A | 2360 | A | 2450 | A |
| Ex. 23 | 2030 | A | 2440 | A | 2270 | A |
| Ex. 24 | 1770 | A | 2010 | A | 2400 | A |
| Ex. 25 | 1680 | A | 1940 | A | 2220 | A |
| Ex. 26 | 2380 | A | 2650 | A | 2600 | A |
| Ex. 27 | 2240 | A | 2410 | A | 2440 | A |
| Comp. Ex. 5 | 110 | D | 260 | D | 290 | D |
| Comp. Ex. 6 | 320 | D | 510 | D | 880 | C |
| Comp. Ex. 7 | 50 | D | 220 | D | 340 | D |

TABLE 7

| | Adhesive Property (gf/40 mm) Cardboard | | | | | |
|---|---|---|---|---|---|---|
| | 0.30 mJ/dot (as-produced) | Evaluation | 0.45 mJ/dot (as-produced) | Evaluation | 0.60 mJ/dot (as-produced) | Evaluation |
| Ex. 17 | 160 | D | 400 | C | 520 | B |
| Ex. 18 | 250 | D | 520 | B | 600 | B |

TABLE 7-continued

| | Adhesive Property (gf/40 mm) Cardboard | | | | | |
|---|---|---|---|---|---|---|
| | 0.30 mJ/dot (as-produced) | Evaluation | 0.45 mJ/dot (as-produced) | Evaluation | 0.60 mJ/dot (as-produced) | Evaluation |
| Ex. 19 | 430 | C | 600 | B | 730 | A |
| Ex. 20 | 580 | B | 770 | A | 990 | A |
| Ex. 21 | 740 | A | 1240 | A | 1640 | A |
| Ex. 22 | 1320 | A | 1790 | A | 1820 | A |
| Ex. 23 | 1350 | A | 1840 | A | 1690 | A |
| Ex. 24 | 1100 | A | 1330 | A | 1730 | A |
| Ex. 25 | 940 | A | 1240 | A | 1700 | A |
| Ex. 26 | 1720 | A | 1810 | A | 1750 | A |
| Ex. 27 | 1690 | A | 1730 | A | 1700 | A |
| Comp. Ex. 5 | 10 | D | 45 | D | 140 | D |
| Comp. Ex. 6 | 120 | D | 155 | D | 460 | C |
| Comp. Ex. 7 | 6 | D | 22 | D | 75 | D |

TABLE 8

| | Activation Energy 0.30 mJ/dot | | Activation Energy 0.45 mJ/dot | | Activation Energy 0.60 mJ/dot | |
|---|---|---|---|---|---|---|
| | Film Shrinkage | Residual Adhesive | Film Shrinkage | Residual Adhesive | Film Shrinkage | Residual Adhesive |
| Ex. 17 | A | B | B | A | C | A |
| Ex. 18 | A | B | B | A | C | A |
| Ex. 19 | A | A | B | A | C | A |
| Ex. 20 | A | A | B | A | C | A |
| Ex. 21 | A | A | B | A | C | A |
| Ex. 22 | A | A | A | A | C | A |
| Ex. 23 | A | A | A | A | B | A |
| Ex. 24 | A | A | A | A | A | A |
| Ex. 25 | A | A | A | A | A | A |
| Ex. 26 | A | A | A | A | A | A |
| Ex. 27 | A | A | A | A | A | A |
| Comp. Ex. 5 | A | C | B | C | C | B |
| Comp. Ex. 6 | C | B | C | B | C | A |
| Comp. Ex. 7 | C | C | C | C | C | C |

From the results of Tables 6 to 8, it is understood that Comparative Examples 5 to 7 come down to inferior adhesive property compared to Examples 17 to 27, which is believed due to that the glass transition temperature is as high as 100° C. in terms of the thermoplastic resin within the underlayer in Comparative Example 5, the hollow ratio of the hollow filler within the underlayer is 0% i.e. non-hollow in Comparative Example 6, and no underlayer exists in Comparative Example 6.

Concerning the inferior results of Example 17 in Table 6 at 0.30 mJ/dot, Example 17 in Table 7 at 0.30 mJ/dot, and Example 18 in Table 7 at 0.30 mJ/dot, these results are believed due to non-optimized heating energy of the thermal head, which are relevant from the results at 0.45 mJ/dot and 0.60 mJ/dot of heating energy in the thermal head.

Concerning the inferior results in terms of film shrinkage of Examples 17 to 22 in Table 8 at 0.30 mJ/dot, these results are also believed due to non-optimized heating energy of the thermal head, which are relevant from the results at 0.45 mJ/dot and 0.60 mJ/dot of heating energy in the thermal head.

As such, the adhesive properties or performances of heat-sensitive adhesive materials of the present invention may be somewhat affected by heating conditions or activation conditions. However, as evidently shown from the results of Examples 17 to 22 at 0.45 mJ/dot of heating energy in the thermal head which is substantially the optimum condition, it is demonstrated that lower film shrinkage, less amount of residual adhesive, and superior adhesive property may be attained even synthetic paper is employed as supports compared to Comparative Examples 5 to 7.

Example 2-1

(1) Preparation of Dye Dispersion A

A mixture containing 20 parts of 3-dibutylamino-6-methyl-N-7-anilinofluoran, 20 parts of 10% aqueous solution of polyvinyl alcohol, and 60 parts of water was milled and dispersed into an average particle diameter of 0.5 μm by use of a sand mill.

(2) Preparation of Color Developer Dispersion B

A mixture containing 20 parts of 4-isopropoxy-4'-hydroxydiphenylsulfone, 10 parts of di-(p-methylbenzyl)oxalate, 10 parts of calcium carbonate, 30 parts of 10% aqueous solution of polyvinyl alcohol, and 30 parts of water was milled and dispersed into an average particle diameter of 0.5 μm by use of a ball mill.

(3) Preparation of Coating Liquid of Thermosensitive Recording Layer

A mixture containing 20 parts of the dye dispersion A liquid, 60 parts of the color developer dispersion B liquid, 30 parts of carboxy-modified polyvinyl alcohol (solid content: 10%, KL-318, by Kuraray Co.), and 1 part of dioctylsulfosuccinate aqueous solution (solid content: 5%) was blended to prepare a coating liquid of thermosensitive recording layer.

(4) Preparation of Coating Liquid of Protective Layer

A mixture containing 40 parts of aluminum hydroxide dispersion (solid content: 50%), 6 parts of zinc stearate dispersion (solid content: 30%), 1 part of dioctylsulfosuccinate aqueous solution (solid content: 5%), 200 parts of 10% aqueous solution of polyvinyl alcohol having diacetone group (content of diacetone monomer unit: 4%, polymerization degree: 1,600, saponification degree: 98%, by Shin-Etsu Chemical Co.), 10 parts of hydrazide adipate aqueous solution (crosslinking agent, solid content: 10%), and 43 parts of water was blended to prepare a protective-layer coating liquid.

(5) Coating of Thermosensitive Recording Layer and Protective Layer

The coating liquid of thermosensitive recording layer was coated and dried on a support (high quality paper, basis mass: 60 g/m$^2$) in an amount of 0.6 g/m$^2$ as the dye after drying, thereby a thermosensitive recording layer was formed. Then the coating liquid of protective layer was coated and dried in an amount of 3 g/m$^2$ after drying, and the surface of the protective layer was calender-treated to a smoothness of 5000 seconds.

(6) Preparation of Hot-Melt Substance Dispersion

A mixture containing 100 parts of 2-(3'-t-butyl-5'-methyl-2'-hydroxyphenyl)-5-chlorobenzotriazole, 50 parts of 10% solution of methylcellulose, and 200 parts of water was uniformly blended and dispersed into an average particle size of 1.0 μm by use of a ball mill.

(7) Preparation of Heat-Sensitive Adhesive Liquid

A mixture containing 100 parts of thermoplastic resin emulsion AP5570 (based on 2-ethylhexylacrylate resin, solid content: 55%, Tg: −65° C., by Showa Highpolymer Co.), 70 parts of tackifier emulsion E100 (based on terpenephenol, solid content: 50%, softening temperature: 145° C., by Arakawa Chemical Industries Ltd.), 540 parts of hot-melt substance dispersion, and 130 parts of water was stirred and blended sufficiently to prepare a heat-sensitive adhesive liquid.

(8) Coating of Heat-Sensitive Adhesive Liquid

The heat-sensitive adhesive liquid was coated and dried on the surface of support opposite to the thermosensitive recording layer (5) in an amount of 15 g/m$^2$ after drying to prepare a heat-sensitive adhesive material of the present invention.

Example 2-2

A heat-sensitive adhesive material of the present invention was prepared in the same manner as Example 2-1, except that 10% aqueous solution of polyvinyl alcohol having diacetone group (content of diacetone monomer unit: 4%, polymerization degree: 1,600, saponification degree: 98%, by Shin-Etsu Chemical Co.) was added to the heat-sensitive adhesive liquid in a ratio of 12% of the thermoplastic resin emulsion AP5570 as dried mass.

Example 2-3

A heat-sensitive adhesive material of the present invention was prepared in the same manner as Example 2-1, except that 10% aqueous solution of polyvinyl alcohol having diacetone group (content of diacetone monomer unit: 4%, polymerization degree: 1,600, saponification degree: 98%, by Shin-Etsu Chemical Co.) was added to the heat-sensitive adhesive liquid in a ratio of 1% of the thermoplastic resin emulsion AP5570 as dried mass.

Example 2-4

A heat-sensitive adhesive material of the present invention was prepared in the same manner as Example 2-1, except that 10% aqueous solution of polyvinyl alcohol having diacetone group (content of diacetone monomer unit: 4%, polymerization degree: 1,600, saponification degree: 98%, by Shin-Etsu Chemical Co.) was added to the heat-sensitive adhesive liquid in a ratio of 2% of the thermoplastic resin emulsion AP5570 as dried mass, in place of the 10% solution of methylcellulose within the hot-melt substance dispersion (6).

Example 2-5

A heat-sensitive adhesive material of the present invention was prepared in the same manner as Example 2-4, except that 10% aqueous solution of polyvinyl alcohol having diacetone group (content of diacetone monomer unit: 4%, polymerization degree: 1,600, saponification degree: 98%, by Shin-Etsu Chemical Co.) was added to the heat-sensitive adhesive liquid in a ratio of 10% of the thermoplastic resin emulsion AP5570 as dried mass.

Example 2-6

A heat-sensitive adhesive material of the present invention was prepared in the same manner as Example 2-4, except that hydrazide adipate aqueous solution (crosslinking agent, solid content: 10%) was added to the heat-sensitive adhesive liquid in a ratio of 10% of aqueous solution of polyvinyl alcohol having diacetone group (content of diacetone monomer unit: 4%, polymerization degree: 1,600, saponification degree: 98%, by Shin-Etsu Chemical Co.) as dried mass.

Example 2-7

A heat-sensitive adhesive material of the present invention was prepared in the same manner as Example 2-6, except that 10% aqueous solution of polyvinyl alcohol having diacetone group (content of diacetone monomer unit: 4%, polymerization degree: 1,600, saponification degree: 98%, by Shin-Etsu Chemical Co.) was added to the heat-sensitive adhesive liquid in a ratio of 6.5% of the thermoplastic resin emulsion AP5570 as dried mass.

Example 2-8

A heat-sensitive adhesive material of the present invention was prepared in the same manner as Example 2-7, except that thermoplastic resin emulsion AP5570 was coated and dried between the heat-sensitive adhesive layer and the support as an intermediate layer in an amount of 15 g/m$^2$ after drying.

Comparative Example 2-1

A heat-sensitive adhesive material of Comparative Example was prepared in the same manner as Example 2-1, except that the coating liquid of protective layer (4) was changed into the coating liquid of protective layer (9) as follows.

(9) Preparation of Coating Liquid of Protective Layer

A mixture containing 40 parts of aluminum hydroxide dispersion (solid content: 50%), 6 parts of zinc stearate dispersion (solid content: 30%), 1 part of dioctylsulfosuccinate aqueous solution (solid content: 5%), 200 parts of carboxy-modified polyvinyl alcohol (solid content: 10%, KL-318, by Kuraray Co.), 50 parts of 12.5% solution of polyamide epichlorohydrin, and 43 parts of water was blended to prepare a protective-layer coating liquid.

Comparative Example 2-2

A heat-sensitive adhesive material of Comparative Example was prepared in the same manner as Comparative Example 2-1, except that the heat-sensitive adhesive layer was changed into that of Example 2-2.

Comparative Example 2-3

A heat-sensitive adhesive material of Comparative Example was prepared in the same manner as Comparative Example 2-1, except that the heat-sensitive adhesive layer was changed into that of Example 2-3.

Comparative Example 2-4

A heat-sensitive adhesive material of Comparative Example was prepared in the same manner as Comparative Example 2-1, except that the heat-sensitive adhesive layer and the intermediate layer of Example 2-8 were employed.

The heat-sensitive adhesive materials of Examples and Comparative Examples were evaluated as follows. The results are shown in Table 9.

<Measurement of Adhesive Strength>

An activated surface of heat-sensitive adhesive material labels, thermally activated by the process described above, is laminated to an adherent of SUS plate or cardboard by use of a rubber roller at 2 kg pressure, and peeled after two minutes under a condition of peeling angle 180° and peeling speed 300 mm/min. The resistance to peel away is obtained as a value in a unit of gf/40 mm.

<Test Method of Blocking>

With respect to each of the heat-sensitive adhesive materials of Examples and Comparative Examples, the surface of the protective layer and the surface of adhesive layer are contacted at a pressure of 2 kg/cm$^2$, and the heat-sensitive adhesive material was allowed to stand in a condition of 60° C.×30% RH or 40° C.×90% RH for 24 hours; then the contacted surfaces were peeled away, and the blocking property was evaluated in accordance with the following criteria.

Rank 10: separable without sound
Rank 9: some sound generates at peeling, and separable without significant resistance
Rank 8: some sound generates at peeling, and some resistance generates at peeling
Rank 7: sound and resistance generate at peeling, and no layer transfer occurs
Rank 6: fine point-like transfer generates at peeling
Rank 5: transferred material appears at peeling over 30 to 50% of the surface of heat-sensitive adhesive layer or thermosensitive recording layer

TABLE 9

| | Adhesive Strength | | | | Blocking | | Head Matching Rubbing with Platen | |
|---|---|---|---|---|---|---|---|---|
| | SUS Plate | | Cardboard | | | | | |
| | 2 minuites later | 7 days later | 2 minuites later | 7 days later | 60° C. 30% RH | 40° C. 90% RH | 22° C. 65% | 40° C. 90% |
| Ex. 2-1 | 2650 | 2500 | 1530 | 1630 | 8 | 6 | C | C |
| Ex. 2-2 | 1560 | 1440 | 1090 | 1110 | 9 | 6 | A | C |
| Ex. 2-3 | 2180 | 2320 | 1300 | 1260 | 7 | 6 | B | C |
| Ex. 2-4 | 2580 | 2720 | 1570 | 1490 | 7 | 6 | B | C |
| Ex. 2-5 | 1950 | 1880 | 1210 | 1180 | 9 | 6 | A | B |
| Ex. 2-6 | 2640 | 2600 | 1450 | 1320 | 10 | 8 | A | B |
| Ex. 2-7 | 2540 | 2800 | 1300 | 1250 | 10 | 10 | A | A |
| Ex. 2-8 | 2600 | 3210 | 2410 | 2640 | 9 | 9 | A | A |
| Comp. Ex. 2-1 | 2670 | 2520 | 1510 | 1580 | 3 | 3 | C | D |
| Comp. Ex. 2-2 | 1570 | 1430 | 1110 | 1140 | 4 | 3 | B | D |
| Comp. Ex. 2-3 | 2020 | 2140 | 1270 | 1250 | 3 | 3 | C | D |
| Comp. Ex. 2-4 | 2570 | 2990 | 2370 | 2720 | 2 | 1 | D | D |

<Activation Process>

Each of the heat-sensitive adhesive materials of Examples and Comparative Examples was cut into width 4 cm×length 10 cm, and was thermally activated through conducting all dots under the following conditions. The series of measurements were conducted in an environmental condition of 22° C. and 65% RH.

Thermal head: TH-0976SP (by TEC Co.), 8 dot/mm
Resistance: 500 ohms
Activation energy: 26.0 mJ/mm$^2$
Printing Speed: 100 mm/sec
Platen pressure: 6 kgf/line
Platen: silicone material of diameter 1 cm Rank 4: transferred material appears at peeling over 50% or more of the surface of heat-sensitive adhesive layer or thermosensitive recording layer
Rank 3: label partially brakes at peeling
Rank 2: 30% to 50% of label brakes at peeling
Rank 1: 50% or more of label brakes at peeling <Test Method of Printer Matching>

Each of the heat-sensitive adhesive materials of Examples and Comparative Examples was cut into width 4 cm×length 10 cm, and was printed by contacting the thermosensitive recording surface with the thermal head described below under the following conditions.

Thermal head: TH-0976SP (by TEC Co.), 8 dot/mm
Resistance: 500 ohms
Conducting: 1 dot, checkered pattern,
Activation energy: 15.0 mJ/mm$^2$
Printing Speed: 100 mm/sec
Platen pressure: 6 kgf/line
Platen: silicone material of diameter 1 cm
Environment: 22° C.×65% RH, 40° C.×90% RH The rubbing or rustling condition of the surface of the heat-sensitive adhesive material, which contacting with the platen roll, was observed visually and feelingly in terms of the stickiness of the heat-sensitive adhesive material due to rubbing or rustling, and was evaluated in accordance with the following criteria. FIG. 1 shows the checkered conducting pattern.

[Evaluation Criteria]
A: no trace of rubbing, and no stickiness
B: some trace of rubbing, and no stickiness
C: definite trace of rubbing, and some stickiness
D: definite trace of rubbing, and significant stickiness The heat-sensitive adhesive materials of the present invention may represent high pressure-sensitive adhesive strength with respect to rough adherends such as cardboards or polyolefin wraps and lower decrease of adhesive strength with time, may be thermally activated with lower energy and exhibit excellent blocking resistance. In particular, the heat-sensitive adhesive layers hardly fall off at thermal activation even synthetic papers or plastic films are employed as supports, shrinkage wrinkles of supports can be prevented and adhesive residue can be reduced at exchanging labels, therefore, the heat-sensitive adhesive materials of the present invention can be appropriately applied for widely various applications in industrial, commercial, and domestic fields.

What is claimed is:

1. A heat-sensitive adhesive material, comprising:
a support,
an underlayer, and
a heat-sensitive adhesive layer, in this order,
wherein the underlayer comprises a thermoplastic resin and a hollow filler, and the glass transition temperature of the thermoplastic resin is within a range from −70° C. up to but excluding 0° C.,
wherein the hollow filler within the underlayer is spherical hollow particles having a volume average particle diameter of 2.0 μm to 5.0 μm, and hollow ratio of the spherical hollow particles is 70% or higher, and
wherein the mass ratio of the hollow filler to the thermoplastic resin (hollow filler:thermoplastic resin) in the underlayer is 1:0.5 to 1:3.0.

2. The heat-sensitive adhesive material according to claim 1, wherein the heat-sensitive adhesive layer comprises a thermoplastic resin, a tackifier, and a hot-melt substance.

3. The heat-sensitive adhesive material according to claim 2, wherein the thermoplastic resin within the heat-sensitive adhesive layer comprises one of acrylate copolymers, methacrylate copolymers, acrylate-methacrylate copolymers, acrylate-styrene copolymers, acrylate-methacrylate-styrene copolymers, and ethylene-vinyl acetate copolymers.

4. The heat-sensitive adhesive material according to claim 2, wherein the hot-melt substance within the heat-sensitive adhesive layer is a benzotriazole compound expressed by the formula (1) shown below:

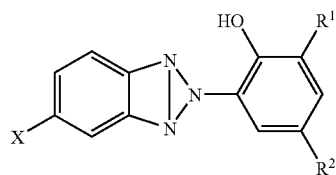

formula (1)

wherein each of $R^1$ and $R^2$ in the formula (1), which may be the same or different each other, represents one of hydrogen atom, alkyl groups, and α,α-dimethylbenzyl group; X represents one of hydrogen atom and halogen atoms.

5. The heat-sensitive adhesive material according to claim 2, wherein the hot-melt substance within the heat-sensitive adhesive layer is a hydroxybenzoate compound expressed by the formula (2) shown below;

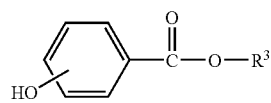

formula (2)

wherein $R^3$ in the formula (2) represents one of alkyl groups, alkenyl groups, aralkyl groups, and aryl groups, which may be further substituted by a substituent.

6. The heat-sensitive adhesive material according to claim 2, wherein the hot-melt substance within the heat-sensitive adhesive layer is a compound expressed by one of formulas (3), (4), and (5) shown below;

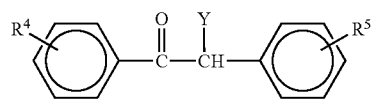

formula (3)

wherein each of $R^4$ and $R^5$ in the formula (3), which may be the same or different each other, represents one of alkyl groups and alkoxy groups; Y represents one of hydrogen atom and hydroxide group;

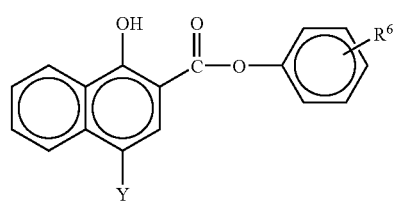

formula (4)

wherein $R^6$ in the formula (4) represents one of hydrogen atom, halogen atoms, alkyl groups, and alkoxy groups; Y represents one of hydrogen atom and hydroxide group;

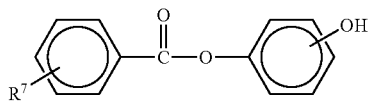

formula (5)

wherein R⁷ in the formula (5) represents one of hydrogen atom, halogen atoms, alkyl groups, and alkoxy groups.

7. The heat-sensitive adhesive material according to claim 2, wherein the heat-sensitive adhesive layer further comprises a eutectic agent, and the eutectic agent is a dibenzyl oxalate compound expressed by formula (6);

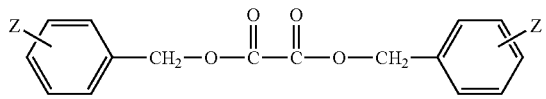

formula (6)

wherein Z in the formula (6) represents one of hydrogen atom, halogen atoms, and alkyl groups.

8. The heat-sensitive adhesive material according to claim 2, wherein the melting point of the tackifier is 80° C. to 200° C.

9. The heat-sensitive adhesive material according to claim 2, wherein the content of the tackifier in the heat-sensitive adhesive layer is 1% by mass to 30% by mass.

10. The heat-sensitive adhesive material according to claim 1, wherein the thermoplastic resin within the underlayer comprises one of acrylate copolymers, methacrylate copolymers, acrylate-methacrylate copolymers, acrylate-styrene copolymers, acrylate-methacrylate-styrene copolymers, and ethylene-vinyl acetate copolymers.

11. The heat-sensitive adhesive material according to claim 1, wherein the material of the spherical hollow particles is a plastic, and the plastic is one of acrylonitrile-vinylidene chloride-methylmethacrylate copolymers and acrylonitrile-methacrylonitrile-isobonylmethacrylate copolymers.

12. The heat-sensitive adhesive material according to claim 1, wherein the hollow filler is present in the underlayer at 0.1 part by mass to 2 parts by mass based on 1 part by mass of the thermoplastic resin.

13. The heat-sensitive adhesive material according to claim 1, wherein the total thickness of the underlayer and the heat-sensitive adhesive layer is 13 μm to 30 μm.

14. The heat-sensitive adhesive material according to claim 1, wherein the heat-sensitive adhesive material further comprises a protective layer and a recording layer on the support in this order opposite to the heat-sensitive adhesive layer.

15. The heat-sensitive adhesive material according to claim 14, wherein the protective layer comprises a polyvinyl alcohol having a reactive carbonyl group and a hydrazide compound.

16. The heat-sensitive adhesive material according to claim 14, wherein the heat-sensitive adhesive material comprises an ink image formed from a UV-curable ink.

17. The heat-sensitive adhesive material according to claim 14, wherein a pre-printing for displaying visual information is printed on a surface of the recording layer, and an eyemark for providing a sensing function is printed on a surface of the heat-sensitive adhesive layer.

18. The heat-sensitive adhesive material according to claim 14, wherein the recording layer is one of thermosensitive recording layer, ink-receiving layer for hot-melt transfer recording, electrophotographic toner-receiving layer, silver halide-containing photographic recording layer, and inkjet ink-receiving layer.

19. The heat-sensitive adhesive material according to claim 18, wherein the thermosensitive recording layer comprises a leuco dye and a color developer.

20. The heat-sensitive adhesive material according to claim 1, wherein the support is one of synthetic papers and plastic films.

21. The heat-sensitive adhesive material according to claim 1, wherein the shape of the heat-sensitive adhesive material is one of labels, sheets, label sheets, and rolls.

22. A heat-sensitive adhesive material, comprising:
a support,
an underlayer, and
a heat-sensitive adhesive layer, in this order,
wherein the underlayer comprises a thermoplastic resin and a hollow filler, and the glass transition temperature of the thermoplastic resin is within a range from −70° C. up to but excluding 0° C.,
wherein the mass ratio of the hollow filler to the thermoplastic resin (hollow filler:thermoplastic resin) in the underlayer is 1:6.0 to 1:20.0.

23. A heat-sensitive adhesive material, comprising:
a protective layer and a thermosensitive recording layer on a side of a support in this order, and
a heat-sensitive adhesive layer on opposite side of the support,
wherein the heat-sensitive adhesive layer comprises a thermoplastic resin and a hot-melt substance, and the protective layer comprises a polyvinyl alcohol having a reactive carbonyl group and a hydrazide compound,
wherein the heat-sensitive adhesive layer comprises a polyvinyl alcohol having a reactive carbonyl group, and
wherein the polyvinyl alcohol having the reactive carbonyl group is present within the heat-sensitive adhesive layer at 3% by mass to 10% by mass of the thermoplastic resin.

24. The heat-sensitive adhesive material according to claim 23, wherein the polyvinyl alcohol having a reactive carbonyl group is utilized as a dispersant for the hot-melt substance within the heat-sensitive adhesive layer.

25. The heat-sensitive adhesive material according to claim 23, wherein the heat-sensitive adhesive layer comprises a hydrazide compound.

26. The heat-sensitive adhesive material according to claim 23, wherein an intermediate layer containing an acrylic tackifier is disposed between the heat-sensitive adhesive layer and the support.

27. The heat sensitive adhesive material according to claim 23, wherein the polyvinyl alcohol having the reactive carbonyl group is present within the heat sensitive adhesive layer at 5% by mass to 8% by mass of the thermoplastic resin.

* * * * *